(12) United States Patent
Choi et al.

(10) Patent No.: US 10,453,246 B2
(45) Date of Patent: Oct. 22, 2019

(54) IMAGE DISPLAY APPARATUS AND METHOD OF OPERATING THE SAME

(71) Applicant: SAMSUNG ELECTRONICS CO., LTD., Suwon-si (KR)

(72) Inventors: Kil-soo Choi, Yongin-si (KR); Young-il Kim, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/681,962

(22) Filed: Aug. 21, 2017

(65) Prior Publication Data

US 2018/0061118 A1    Mar. 1, 2018

(30) Foreign Application Priority Data

Aug. 30, 2016    (KR) .................. 10-2016-0110838

(51) Int. Cl.
*G06T 15/20* (2011.01)
*H04N 13/275* (2018.01)
(Continued)

(52) U.S. Cl.
CPC .............. *G06T 15/20* (2013.01); *G06T 19/20* (2013.01); *G08B 13/19693* (2013.01); *H04N 5/44591* (2013.01); *H04N 13/275* (2018.05); *H04N 13/366* (2018.05); *H04N 21/44008* (2013.01); *H04N 21/4728* (2013.01); *H04N 21/816* (2013.01); *G06T 2200/04* (2013.01); *G06T 2219/2004* (2013.01); *H04N 21/4221* (2013.01)

(58) Field of Classification Search
None
See application file for complete search history.

(56) References Cited

U.S. PATENT DOCUMENTS 8,040,744 B2    10/2011    Gorobets et al.
8,627,236 B2    1/2014    Jung et al.
(Continued)

FOREIGN PATENT DOCUMENTS

JP        2016-99941 A       5/2016
KR    10-2004-0081606 A      9/2004
(Continued)

OTHER PUBLICATIONS

Search Report dated Dec. 7, 2017, issued by the International Searching Authority in counterpart International Patent Application No. PCT/KR2017/009200 (PCT/ISA/210).
(Continued)

*Primary Examiner* — Jeffrey J Chow
(74) *Attorney, Agent, or Firm* — Sughrue Mion, PLLC

(57) ABSTRACT

An image display apparatus and a method of operating the image display apparatus are provided. An image display apparatus includes: a display; a memory configured to store instructions; and a processor configured to execute the instructions to: control the display to display a main view that provides an image of an area that corresponds to an angle of view in a 360-degree image, detect one or more objects in other areas of the 360-degree image than the area that corresponds to the angle of view in the 360-degree image, and control the display to display one or more sub-views that correspond to the one or more objects.

13 Claims, 23 Drawing Sheets

(51) Int. Cl.
| | |
|---|---|
| *H04N 13/366* | (2018.01) |
| *G06T 19/20* | (2011.01) |
| *G08B 13/196* | (2006.01) |
| *H04N 5/445* | (2011.01) |
| *H04N 21/44* | (2011.01) |
| *H04N 21/4728* | (2011.01) |
| *H04N 21/81* | (2011.01) |
| *H04N 21/422* | (2011.01) |

(56) References Cited

U.S. PATENT DOCUMENTS

| | | | |
|---|---|---|---|
| 2008/0106594 | A1 | 5/2008 | Thrun |
| 2010/0002071 | A1 | 1/2010 | Ahiska |
| 2012/0092529 | A1 | 4/2012 | Choi et al. |
| 2014/0063181 | A1* | 3/2014 | Lee ................... G06T 3/0025 348/36 |
| 2015/0309310 | A1 | 10/2015 | Cho et al. |
| 2015/0373296 | A1 | 12/2015 | Ushiyama |

FOREIGN PATENT DOCUMENTS

| | | |
|---|---|---|
| KR | 10-2006-0032694 A | 4/2006 |
| KR | 10-2009-0105637 A | 10/2009 |
| KR | 10-2010-0022874 A | 3/2010 |
| KR | 10-2011-0048892 A | 5/2011 |
| KR | 10-2011-0121679 A | 11/2011 |
| KR | 10-2012-0040611 A | 4/2012 |
| KR | 10-1139287 B1 | 4/2012 |
| KR | 10-2013-0055967 A | 5/2013 |
| KR | 10-2015-0122355 A | 11/2015 |
| WO | 2007094802 A2 | 8/2007 |
| WO | 2007094802 A3 | 8/2007 |
| WO | 2014181529 A1 | 11/2014 |

OTHER PUBLICATIONS

Written Opinion dated Dec. 7, 2017, issued by the International Searching Authority in counterpart International Patent Application No. PCT/KR2017/009200 (PCT/ISA/237).

Communication dated Feb. 2, 2018, issued by the European Patent Office in counterpart European Patent Application No. 17186849.0.

Communication dated May 2, 2018, issued by the European Patent Office in counterpart European Application No. 17186849.0.

* cited by examiner

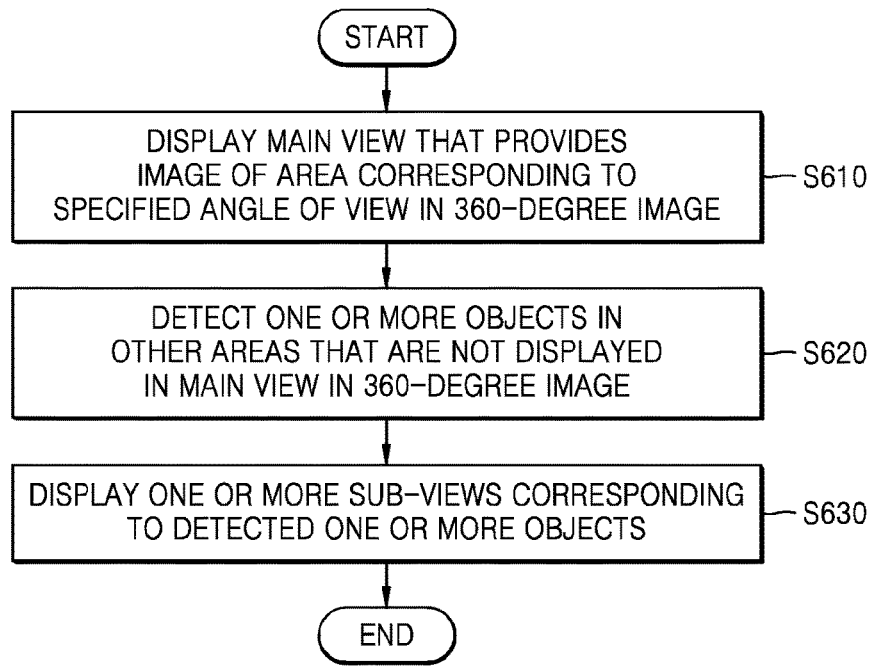
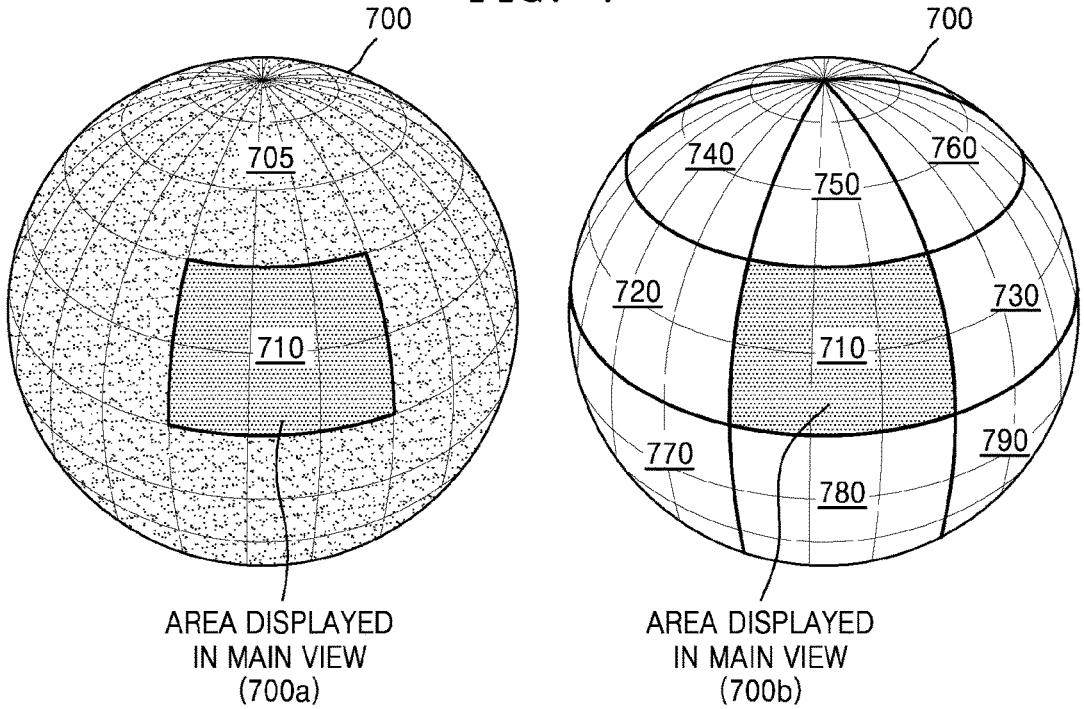

IMAGE DISPLAY APPARATUS AND METHOD OF OPERATING THE SAME

CROSS-REFERENCE TO RELATED APPLICATION

This application claims priority from Korean Patent Application No. 10-2016-0110838, filed on Aug. 30, 2016, in the Korean Intellectual Property Office, the disclosure of which is incorporated herein by reference in its entirety.

BACKGROUND

1. Field

Apparatuses and methods consistent with exemplary embodiments relate to an image display apparatus and a method of operating the same, and more particularly, to an image display apparatus that displays a 360-degree image and a method of operating the same.

2. Description of the Related Art

Image display apparatuses have a function of displaying images that users can watch. Users can watch broadcasts through image display apparatuses. Image display apparatuses display, on a display, a broadcast selected by a user from among broadcast signals transmitted from a broadcast station. Currently, broadcasting is changing from analog broadcasting to digital broadcasting around the world.

Digital broadcasting includes broadcasting digital images and audio signals. Compared to analog broadcasting, digital broadcasting has a relatively small data loss due to its robustness against external noise, is advantageous in terms of error correction, has a high resolution, and provides a clear screen. In addition, unlike analog broadcasting, digital broadcasting is capable of a bidirectional service.

In addition, in recent years, a smart television (TV) providing various types of content, in addition to a digital broadcast function, has been provided. The goal of the smart TV is not to operate manually according to the user's selection, but instead to analyze and provide what the user desires without the user's manipulation.

SUMMARY

Various exemplary embodiments provide an image display apparatus that effectively displays an object included in a 360-degree image, and a method of operating the image display apparatus.

Additional aspects will be set forth in part in the description which follows and, in part, will be apparent from the description, or may be learned by practice of the presented exemplary embodiments.

According to an aspect of an exemplary embodiment, an image display apparatus includes: a display; a memory configured to store at least one instruction; and a processor configured to execute the instructions to control the display to display a main view that provides a first image of a first area that corresponds to a first angle of view in a 360-degree image, detect at least one object in at least one area of the 360-degree image other than the first area, and control the display to display at least one sub-view that corresponds to the at least one object.

The processor may be further configured to execute the instructions to determine a second area that corresponds to a second angle of view that includes each of the detected objects, and determine a sub-view that provides a second image that corresponds to the second area.

The processor may be further configured to execute the instructions to perform at least one of a facial recognition operation and a motion detecting operation in order to detect the one or more objects.

The processor may be further configured to execute the instructions to receive information that relates a specific detection object via a user interface, and to detect the specific detection object based on the received information.

The processor may be further configured to execute the instructions to obtain the information that relates to the specific detection object from metadata that corresponds to the 360-degree image, and to detect the specific detection object based on the obtained information.

The processor may be further configured to execute the instructions to detect the specific detection object in response to a user's request or in an automatic manner.

According to an aspect of another exemplary embodiment, an image display apparatus includes: a display; a memory configured to store instructions; and a processor configured to execute the instructions to control the display to display a first image of a first area that corresponds to a first angle of view in a 360-degree image; in response to detecting an event that indicates a user input that has a direction and a predetermined pattern, detect at least one object that appears when the angle of view is shifted toward the direction; and control the display to jump to a second area that includes the at least one object or to increase a rotational speed until the second area that includes the at least one object is reached, or to move the at least one object detected in a sub-view to a main view in order to display the at least one object in the main view, and to display a second image that corresponds to the second area that includes the detected at least one object.

The processor may be further configured to execute the instructions to, in response to detecting a cancellation of the event, stop the jumping or the increasing of the rotational speed.

The user input includes at least one from among a long press and a double press of a direction key.

According to an aspect of another exemplary embodiment, a method of operating an image display device includes: displaying a main view that provides a first image of a first area that corresponds to a first angle of view in a 360-degree image, detecting at least one object in at least one area of the 360-degree image other than the first area, and displaying at least one sub-view that corresponds to the detected at least one object.

According to an aspect of another exemplary embodiment, a method of operating an image display device includes: displaying a first image of a first area that corresponds to a first angle of view in a 360-degree image, and, in response to detecting an event that indicates a user input that has a direction and a predetermined pattern, detecting at least one object that appears when the angle of view is shifted toward the direction, and jumping to a second area that includes the at least one object or increasing a rotational speed until the second area that includes the at least one object is reached, or moving the at least one object detected in a sub-view to a main view in order to display the at least one object in the main view, and displaying a second image that corresponds to the second area that includes the at least one detected object.

According to an aspect of another exemplary embodiment, provided is a non-transitory computer-readable recording medium having recorded thereon a program for executing, on a computer, the method described above.

According to an aspect of another exemplary embodiment, an image display apparatus includes a display and a processor. The processor is configured to control the display to display a first image of a first area that corresponds to a first angle of view with respect to a 360-degree image, detect at least one object that is included in the 360-degree image and is not included in the first area, and control the display to display a second image of a second area that includes at least one of the at least one object.

The processor may be further configured to determine a second angle of view that corresponds to the second area.

The processor may be further configured to perform at least one from among a facial recognition operation and a motion detecting operation in order to detect the at least one object.

The processor may be further configured to receive, via a user interface, information that relates to a specific detection object, and to detect the specific detection object based on the received information. The processor may be configured to obtain the information that relates to the specific detection object from metadata that corresponds to the 360-degree image, and to detect the specific detection object based on the obtained information.

BRIEF DESCRIPTION OF THE DRAWINGS

The above and/or other aspects will become apparent and more readily appreciated from the following description of exemplary embodiments, taken in conjunction with the accompanying drawings in which:

FIG. 6 is a flowchart illustrating a process of displaying a sub-view based on an object in the image display apparatus, according to an exemplary embodiment;

FIG. 7 is a reference view for explaining an area of a 360-degree image, on which an object detection operation is performed;

DETAILED DESCRIPTION

Figure 1:
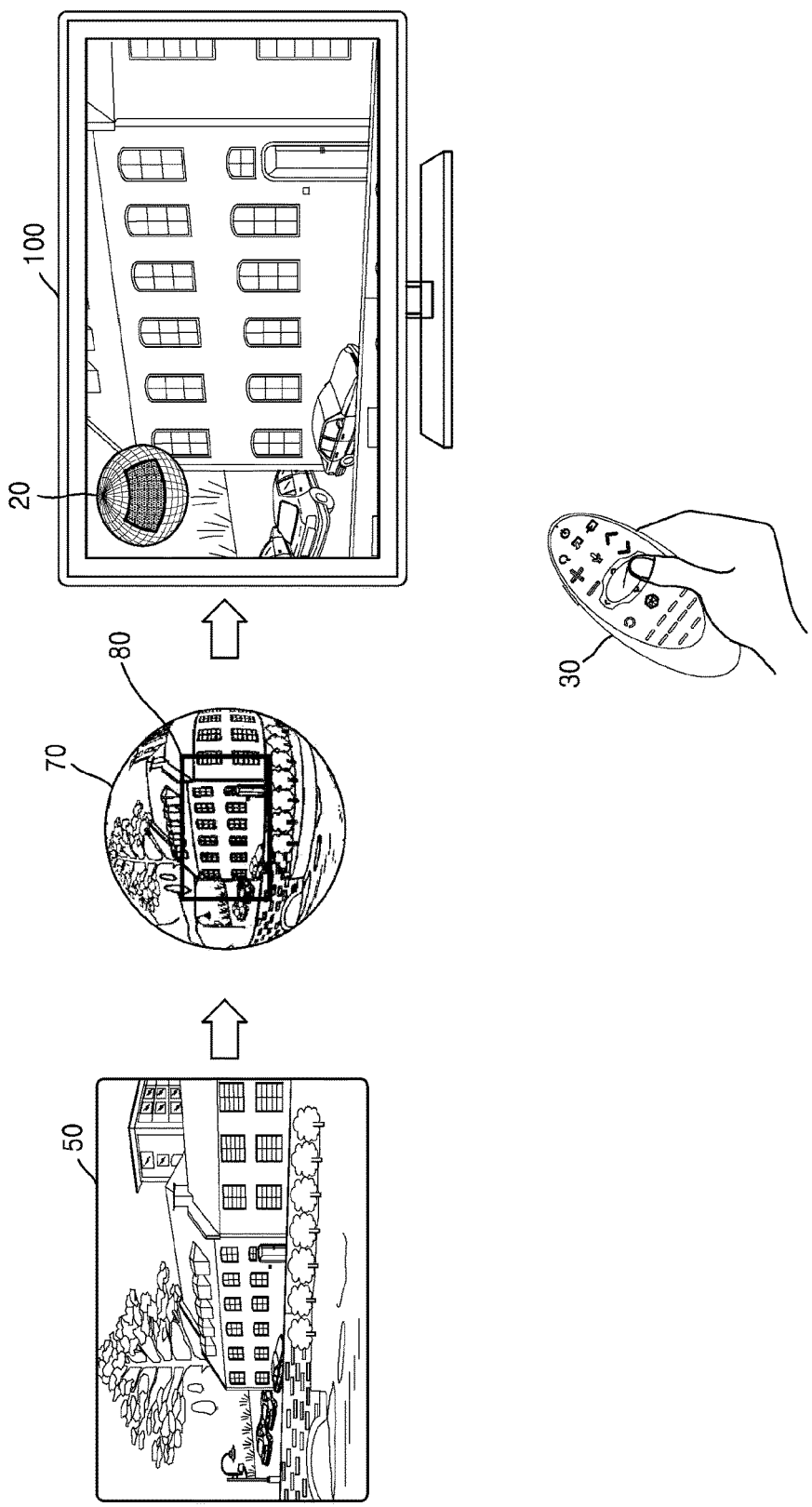
FIG. 1 is a view of an image display apparatus displaying a 360-degree image and a control device, according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The terms used in this specification will be briefly described and exemplary embodiments of the present disclosure will be described in detail.

For the terms used to describe exemplary embodiments of the present disclosure, widely used, general terms are selected in consideration of their functions in the present disclosure. However, the meaning of these terms may vary depending on the intention or circumstance of a person of ordinary skill in the art, the emergence of new technology, and the like. Further, in certain cases, there is a term arbitrarily selected by the applicants, and in this case, the meaning thereof will be described in the detailed description of the present specification. Therefore, the term used in describing the present disclosure should be defined based on the meaning of the term and the overall description about the present disclosure, not on the literal meaning of the term.

When an element "includes" a component throughout the specification, it is to be understood that, unless specifically stated otherwise, the element may further include other components, not excluding other components. Further, the terms " . . . er, or, unit" and "module" as described in the specification, refer to a unit for processing at least one function or operation, which may be implemented by hardware or software or by a combination of hardware and software.

Hereinafter, exemplary embodiments of the present disclosure will be described in detail with reference to the accompanying drawings in such a way that a person having ordinary skill in the art may easily implement the exemplary embodiments. The present inventive concept may, however, be embodied in many different forms and should not be construed as limited to the exemplary embodiments set forth herein. In order to clearly illustrate the present inventive concept, elements not related to the description are omitted from the drawings, and like elements are denoted by like reference numerals throughout the specification.

The term "user" used in describing exemplary embodiments in the present specification means a person who controls a function or operation of an image display apparatus by using a control device, and may include any of a viewer, an administrator, and/or an installer.

FIG. 1 is a view of an image display apparatus 100 displaying a 360-degree image and a control device 30, according to an exemplary embodiment.

Referring to FIG. 1, the image display apparatus 100 according to an exemplary embodiment may display a 360-degree image. A 360-degree image according to an exemplary embodiment may be an image having an angle of view of 360 degrees. The 360-degree image may be any of a still image, a moving image, or a panoramic image. For example, a 360-degree image may be an image generated based on a plurality of images taken at 360 degrees by using at least one camera. In this regard, the obtained images may be mapped to a sphere, and the contacts of the mapped images may be connected (i.e., stitched) to generate a sphere-type 360-degree image. In one exemplary embodiment, the sphere-type 360-degree image may be converted to a plane-type 360-degree image 50 as shown in FIG. 1, for transmission to or storage in other devices.

The image display apparatus 100 according to an exemplary embodiment may perform graphic processing on the plane-type 360-degree image 50 to convert the plane-type 360-degree image 50 into a sphere-type 360-degree image 70. The image display apparatus 100 may select an area 80 that corresponds to a certain angle of view in the sphere-type 360-degree image 70 and display an image corresponding to the area 80 on a display. In this regard, the image display apparatus 100 may display an image corresponding to the selected area 80 by scaling according to the resolution of the display. In one exemplary embodiment, the image display apparatus 100 may display a three-dimensional indicator 20 indicating the position of the area 80 within a 360-degree image. The angle of view of the 360-degree image will be described in detail below with reference to FIG. 2.

The image display apparatus 100 according to an exemplary embodiment may be a television (TV), but is not limited thereto, and may be implemented in any electronic device that includes a display. For example, the image display apparatus 100 may be any of a mobile phone, a tablet PC, a digital camera, a camcorder, a laptop computer, a desktop, an electronic book terminal, a digital broadcast terminal, a personal digital assistant (PDA), a portable multimedia player (PMP), a navigation device, a MP3 player, a wearable device, or any other electronic device. Exemplary embodiments may be easily implemented in a display apparatus having a large display such as a TV, but are not limited thereto. In one exemplary embodiment, the image display apparatus 100 may be of a fixed type or a mobile type, and may be a digital broadcasting receiver capable of receiving digital broadcasting signals.

The image display apparatus 100 may be implemented not only as a flat display apparatus but also as a curved display apparatus having a curved screen or a flexible display apparatus capable of having its curvature adjusted. The output resolution of the image display apparatus 100 may include, for example, high definition (HD), full HD, ultra HD, or a resolution that is higher than ultra HD.

In one exemplary embodiment, the image display apparatus 100 may be controlled by the control device 30, and the control device 30 may be implemented in various types of devices for controlling the image display apparatus 100. For example, the control device 30 may be implemented in a remote controller or a mobile phone.

In an exemplary embodiment, the controller 30 may control the image display device 100 by using short distance communication that includes, for example, infrared light or Bluetooth. The control device 30 may control the function of the image display apparatus 100 by using at least one selected from a provided key (including a button), a touch pad, a microphone capable of receiving a user's voice, and a sensor capable of recognizing the motion of the control device 30.

The control device 30 according to one exemplary embodiment may include a four-direction key (or a four-direction button). The four-direction key may be used to move the position of the area 80 displayed on a display in a 360-degree image.

In one exemplary embodiment, the controller 30 may be a pointing device. For example, the controller 30 may operate as a pointing device when receiving a specific key input. When the controller 30 operates as a pointing device, the image display device 100 may be controlled by a user input that moves the controller 30 up, down, left, right or tilts the controller 30 in an arbitrary direction. Information that relates to the motion of the controller 30 sensed by the sensor of the controller 30 may be transmitted to the image display apparatus 100. The image display apparatus 100 may move the area 80 displayed on a display in the 360-degree image based on the information that relates to the motion of the control device 30.

In one or more exemplary embodiments, when the control device 30 includes a touch pad, the position of the area 80 displayed on a display in the 360-degree image may be moved based on a displacement value of a subject, such as the finger of the user, that moves on the touch pad.

Figure 2:
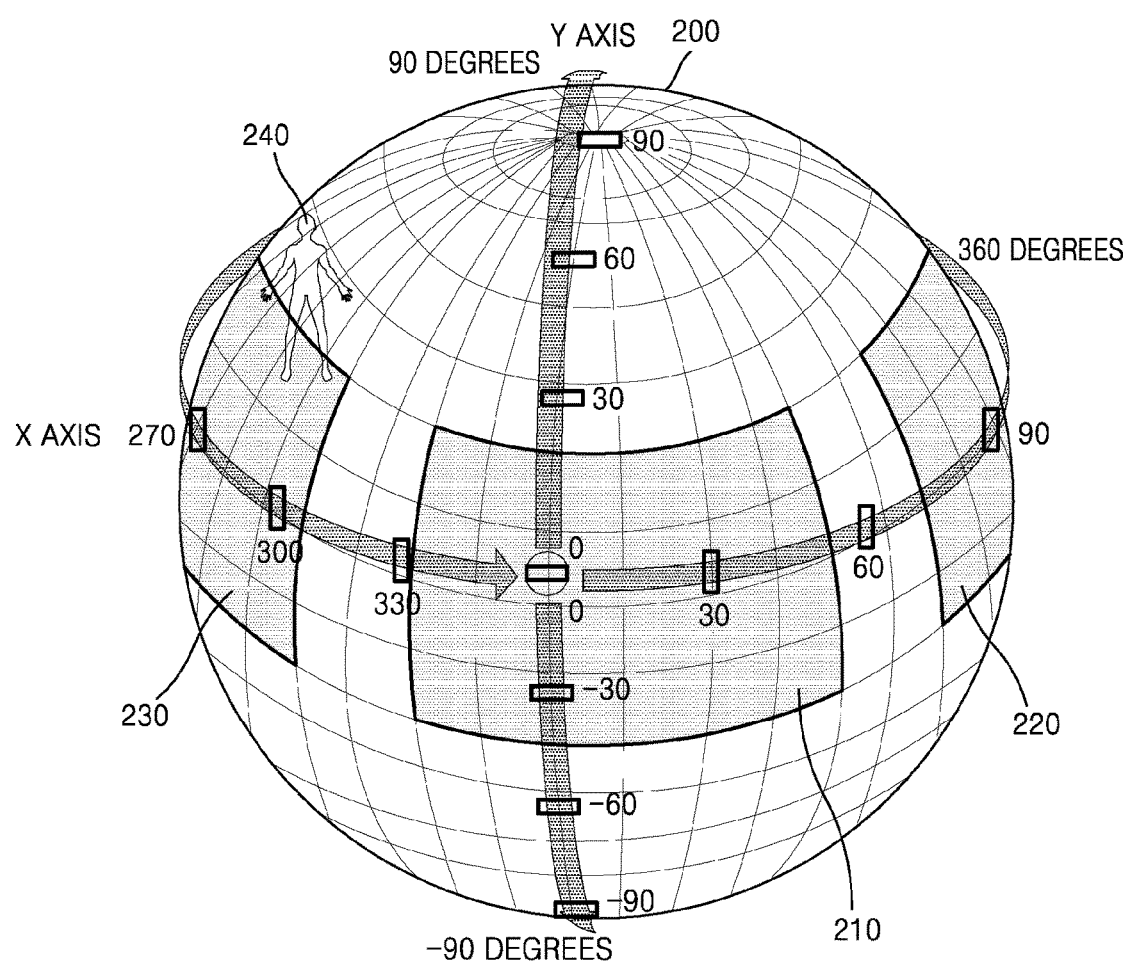
FIG. 2 shows a view for explaining an angle of view of a 360-degree image.

FIG. 2 shows a view for explaining an angle of view of a 360-degree image.

As described above, a 360-degree image may be an image generated based on a plurality of images taken at 360 degrees by using at least one camera. In this regard, the obtained images may be mapped to a sphere, and the contacts of the mapped images may be connected (i.e., stitched) to generate a sphere-type 360-degree image.

The 360-degree image according to an exemplary embodiment may be an image having an angle of view of 360 degrees. When the 360-degree image is expressed by a spherical image 200, the angle of view of the 360-degree image may be indicated by the use of an x-axis coordinate and a y-axis coordinate. The x-axis coordinate may represent an angle formed by a vertical plane passing through the center of the sphere while rotating along the surface of the sphere. The y-axis coordinate may represent an angle formed by a horizontal plane passing through the center of the sphere while rotating along the sphere surface. In one exemplary embodiment, the x-axis coordinate may range from 0 degrees to 360 degrees. In one exemplary embodiment, the y-axis coordinate may range from −90 degrees to 90 degrees or from 0 degrees to 180 degrees.

Referring to FIG. 2, for example, the image display apparatus 100 may display an image of an area 210 including an angle of view (0,0) of the spherical image 200 in a main view of a display. In one exemplary embodiment, in order to further provide a user with information about other areas not displayed in the main view of the spherical image 200, the image display apparatus 100 may display a right area 220 including an angle of view (90,0) in a sub-view and a left area 230 including an angle of view (270,0) in another sub-view. However, when a sub-view is provided based only on the angle of view without being based on an object, the sub-view may not contain any objects or any valid information or images. Referring to FIG. 2, an object 240 is included in and beyond the left area 230. Accordingly, as in the previous example, when the sub-view of the left area 230 and the sub-view of the right area 220 are provided, the object 240 may not be displayed in the sub-views. Thus, when providing one or more sub-views together with the main view, an image display apparatus may provide sub-views based on an object, rather than a fixed angle of view.

The user may move from an image displayed on the image display device 100 to another image by using the controller 30. In one exemplary embodiment, by pressing a right-direction key among the four-direction keys of the control device 30, an image that corresponds to an area shifted rightward by 5 degrees may be displayed on the image display apparatus 100. In one or more exemplary embodiments, it may be required to quickly search for or reproduce one or more objects included in a 360-degree image by using a user input of a specific pattern. In one exemplary embodiment, referring to FIG. 2, the object 240 is positioned at approximately 300 degrees in the x-axis direction. With an image that corresponds to the area 210 being displayed on the image display device 100, by a pattern in which the user presses the right-direction key of the controller 30 in a particular way, the image display device 100 may detect an object included in the area in the right direction, and may quickly move to or jump directly to an area that includes the detected object. In this aspect, although conventional methods teach rotation based on a constant rotation speed in a predetermined direction, according to exemplary embodiments provided herein, a user may rotate to an image faster or jump to a specific position.

Figure 3:
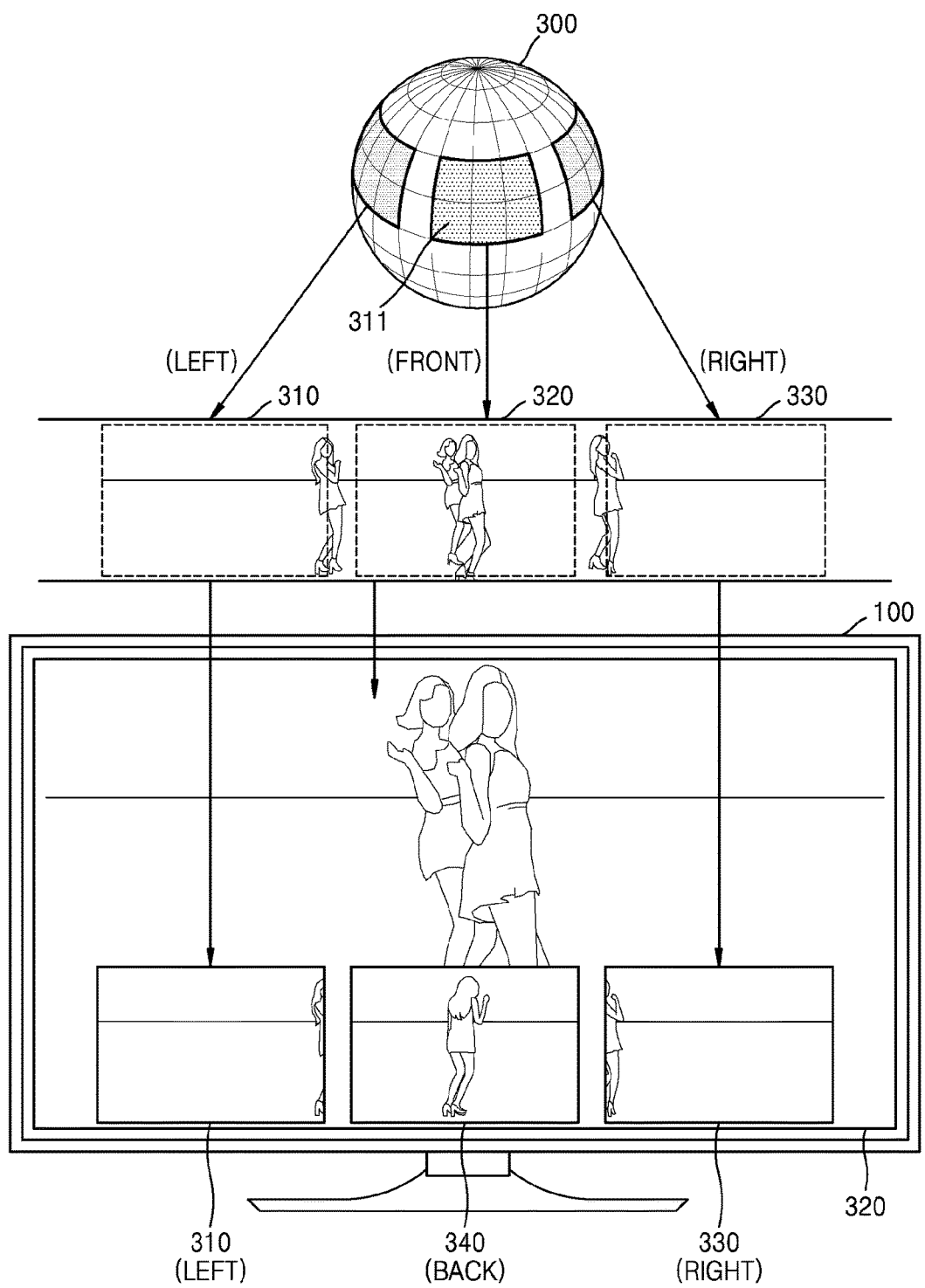
FIG. 3 is a view for explaining a method of displaying a 360-degree image, according to an exemplary embodiment.

FIG. 3 is a view for explaining a method of displaying a 360-degree image, according to an exemplary embodiment.

The user may navigate around a 360-degree image in order to view an image that corresponds to a target angle in the 360-degree image. Referring to FIG. 3, when the user, who has been viewing an image 320 of an area 311 that corresponds to the angle of view of zero (0) degrees, wants to view an image that is located in a more rightward direction, the user may select a user input of adjusting an angle of view by using the control device 30. In one exemplary embodiment, when the user selects a user input that changes the angle of view by 60 degrees, the image display apparatus 100 may display an image of an area that corresponds to an angle of view of 60 degrees.

The image display apparatus 100 may use a main view and one or more sub-views to display a 360-degree image. Referring to FIG. 3, the image display apparatus 100 may provide a main view 320 displayed on the entire display, and one or more sub-views, including first, second, and third sub-views 310, 330, and 340, each of which occupies a smaller area on a part of a display. When the image display apparatus 100 determines an area displayed in one or more sub-views based on an angle of view rather than the center of an object, the image display apparatus 100 displays an image that corresponds to the left area in the first sub-view 310, an image that corresponds to the back area in the second sub-view 340, and an image that corresponds to the right area in the third sub-view 330. However, since an image of an area that corresponds to a fixed angle of view, that is, a fixed direction, is displayed in sub-views regardless of where the object is positioned, as shown in FIG. 3, only a part of the object may be displayed in the first sub-view 310 and the third sub-view 330, or the object may not appear in the first sub-view 310 and the third sub-view 330. In order not to generate such a sub-view that displays meaningless images, sub-views may be provided based on an object, rather than on an angle of view.

In one exemplary embodiment, the user may move the angle of view of the 360-degree image by using the four-direction key of the control device 30. In one exemplary embodiment, the left and right arrow keys of the 4-way key may be used to move the 360-degree image left or right. In one exemplary embodiment, the 360-degree image may be moved up and down by using the up and down arrow keys of the four-direction key.

In one exemplary embodiment, the user may adjust the angle of view of the 360-degree image by moving the control device 30, which includes an acceleration sensor or a gyroscope, up, down, left, or right or in any direction.

In one exemplary embodiment, the user may adjust the angle of view of the 360-degree image based on the direction in which the user's finger is moved while touching a touch pad that is provided on the control device 30.

In one exemplary embodiment, when the image display apparatus 100 is configured to include a touch-sensitive screen, the user may adjust the angle of view of the 360-degree image by using the touch movement of the user's finger on the touch-sensitive screen, that is, on the image display apparatus 100.

In one exemplary embodiment, the user may zoom in or out the 360-degree image by using a specific key or button of the control device 30 or a gesture formed by using the control device 30. In response to a zoom-in input, the image display apparatus 100 may enlarge the area currently displayed and display the enlarged image. In response to a zoom-out input, the image display apparatus 100 may display the current display area in a reduced size. In one exemplary embodiment, when a zoom-out degree exceeds a predetermined threshold value, the image display apparatus 100 may display an image in a spherical shape. In one exemplary embodiment, the zooming may range from ¼ to 4 times the original size of the display area.

In one exemplary embodiment, the image display apparatus 100 may control a jump or a high-speed rotation to an object included in a 360-degree image by using a user input of a specific pattern. In one exemplary embodiment, by clicking the right-direction key of the control device 30 once, the image display apparatus 100 may display an image of an area that corresponds to a predetermined angle by which the angle of view of the 360-degree image is shifted to the right, and, by long pressing the right-direction key of the control device 30, the image display apparatus 100 may detect the next object in an area in the right direction of the 360-degree image and directly jump to the area that includes the detected object and display the area, or may control the 360-degree image to rotate quickly before reaching the area that includes the detected object.

Figure 4:
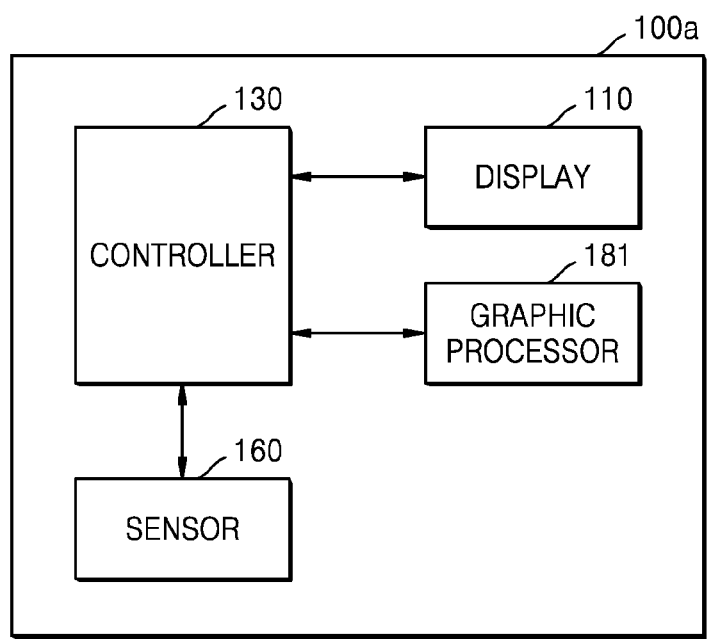
FIG. 4 is a block diagram illustrating a configuration of an image display apparatus for displaying a 360-degree image, according to an exemplary embodiment.

FIG. 4 is a block diagram illustrating a configuration of an image display apparatus for displaying a 360-degree image, according to an exemplary embodiment. The image display apparatus 100a of FIG. 4 may be an example of the image display apparatus 100 of FIG. 1.

Referring to FIG. 4, the image display apparatus 100a according to an exemplary embodiment may include a sensor 160, a controller 130, a graphic processor 181, and a display 110.

The display 110 converts an image signal, a data signal, an on-screen display (OSD) signal, a control signal, and the like which have been processed by the control unit 130 in order to generate a driving signal. The display 110 may be implemented as any of a plasma display panel (PDP), a liquid crystal display (LCD), an organic light-emitting diode (OLED) display, a flexible display, or the like, and may also be implemented as a 3D display. In one exemplary embodiment, the display 110 may be configured as a touch screen and used as an input device, in addition to being usable as an output device.

According to an exemplary embodiment, the display 110 may display an image of an area that corresponds to a predetermined angle of view in the 360-degree images. In one exemplary embodiment, in response to a user input for adjusting the angle of view, the display 110 may display an image that corresponds to the adjusted angle of view.

The sensor 160 may sense a user input and transmit the sensed signal to the controller 130. In one exemplary embodiment, the sensor 160 may sense user inputs, such as power on/off, channel selection, channel-up/down, and screen setting, from the control device 30. In one exemplary embodiment, the sensor 160 may sense an input for moving a position of an area displayed on the display 110 in the 360-degree image, an input for zooming in or zooming out an image displayed on the display, and an input for displaying an image that corresponds to a specific area of the 360-degree image, and the like. In one exemplary embodiment, the sensor 160 may sense a user input of a specific pattern performed by using the control device 30. In one exemplary embodiment, the user input of a particular pattern may include a long press, or a double click. However, the user input of a specific pattern is not limited thereto, and may include any user input of a pattern that is defined by an image display apparatus as a pattern, regardless of a specific pattern or a voice of a specific pattern.

The control unit 130 may process an image signal and transmit the processed image signal to the display 110. Accordingly, an image that corresponds to the image signal may be displayed on the display 110. In one exemplary embodiment, the controller 130 may control the display 110 based on a user command sensed by the sensor 160 or an internal program.

In one exemplary embodiment, the controller 130 may move the position of the area displayed on the display in the 360-degree image in response to the sensed user input, and may control the display 110 such that the display 110 displays an image that corresponds to the moved area.

In one exemplary embodiment, in response to the sensed user input of a specific pattern, the controller 130 may detect one or more objects included in the 360-degree image and directly jump to an area that contains the detected objects, or increase the rotational speed until an area that includes the detected objects is reached, and control the display to display the area.

In one exemplary embodiment, the controller 130 may control the display to display a main view that provides an image of an area that corresponds to a specified angle of view in a 360-degree image, and the controller 130 may detect one or more objects in other areas that are not displayed in the main view and control the display to display one or more sub-views that correspond to the detected one or more objects.

The graphic processor 181, as described with reference to FIG. 1, may map a 360-degree image in a plane format onto a sphere to generate a sphere format of the 360-degree image.

In one exemplary embodiment, the graphic processor 181 may detect one or more objects in a 360-degree image and determine an area that includes the one or more objects.

Figure 5:
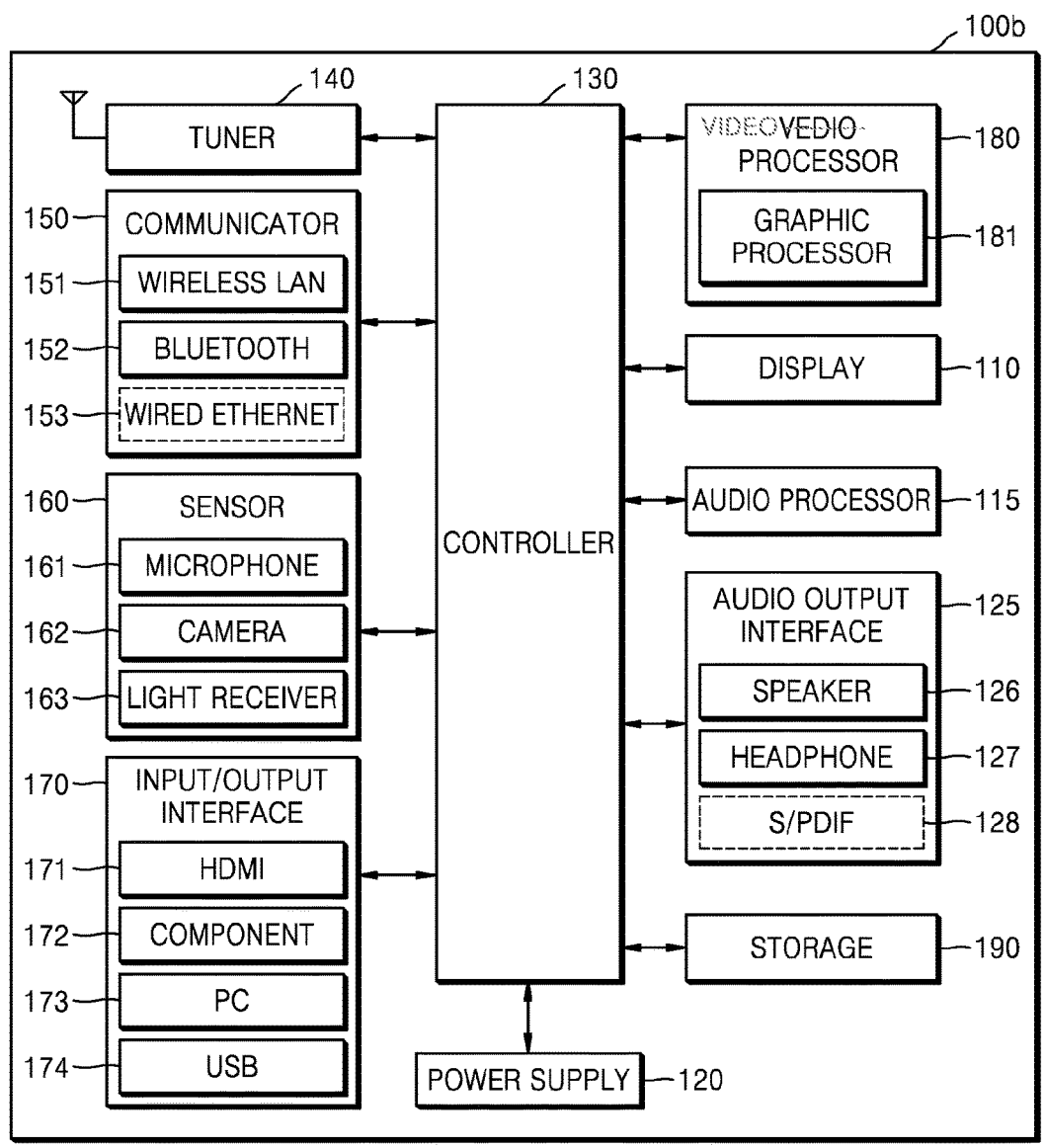
FIG. 5 is a block diagram illustrating a configuration of an image display apparatus for reproducing a 360-degree image, according to an exemplary embodiment.

FIG. 5 is a block diagram illustrating a configuration of an image display apparatus for reproducing a 360-degree image, according to an exemplary embodiment. The image display apparatus 100b of FIG. 4 may be an example of the image display apparatus 100 of FIG. 1.

Referring to FIG. 5, the image display apparatus 100b according to an exemplary embodiment includes a controller 130, a display 110, and a sensor 160, and may further include a video processor 180, an audio processor 115, an audio output interface 125, a power supply 120, a tuner 140, a communicator 150, an input/output interface 170, and a storage (also referred to herein as a "memory") 190.

The descriptions about the controller 110, the display 110, and the sensor 160, provided above in connection with FIG. 2, will be omitted in explaining exemplary embodiments in connection with FIG. 5.

The video processor 180 performs processing on the video data received by the image display apparatus 100b. The video processor 180 may perform any of various image processing functions, such as decoding, scaling, noise filtering, frame rate conversion, resolution conversion, and the like, on the video data.

The graphic processor 181 generates a screen that may include any of various objects, such as an icon, an image, and a text, by using a calculator and a rendering unit (also referred to herein as a "renderer"). The calculator calculates an attribute value, such as a coordinate value, a shape, a size, and a color, of each object to be displayed according to the layout of the screen by using the user input sensed by the sensor 160. The rendering unit generates a screen of various layouts which include objects based on attribute values calculated by the calculator. The screen generated by the rendering unit is displayed in a display area of the display 110. The graphic processor 181 according to one exemplary embodiment may, as described above in connection with FIG. 1, map a 360-degree image in a plane format to a sphere in order to generate a 360-degree image in a spherical form. In one exemplary embodiment, the graphic processor 181 may perform at least one of a face detecting operation, an object detecting operation, and a motion detecting operation in a 360-degree image.

The display 110 displays video included in the broadcast signal received via the tuner 140 on the screen under the control of the controller 130. In one exemplary embodiment, the display 110 may display the content (for example, moving image) input via the communicator 150 or the input/output interface 170. The display 110 may output an image stored in the storage 190 under the control of the controller 130. In one exemplary embodiment, the display 110 may display a voice user interface (UI) (including a voice command word guide) for performing a voice recognition task that corresponds to voice recognition, or a motion UI (for example, including a user motion guide for motion recognition) for performing a motion recognition task that corresponds to motion recognition.

The audio processor 115 performs processing on audio data. In the audio processor 115, various processes or processing functions, such as decoding and amplification of audio data, noise filtering, and the like, may be performed. In this aspect, the audio processor 115 may include a plurality of audio processing modules which are configured for processing audio that corresponds to a plurality of content.

The audio output interface 125 outputs audio included in the broadcast signal received via the tuner 140 under the control of the controller 130. The audio output interface 125 may output audio (for example, voice, sound) input via the communicator 150 or the input/output interface 170. The audio output interface 125 may output audio stored in the storage 190 under the control of the controller 110. The audio output interface 125 may include at least one of a speaker 126, a headphone output terminal 127, and a Sony/Philips digital Interface (S/PDIF) output terminal 128. The audio output interface 125 may include a combination of the speaker 126, the headphone output terminal 127, and the S/PDIF output terminal 128.

The tuner 140 tunes only a frequency of a channel to be received by the image display apparatus 100b among many radio wave components through amplification, mixing, and resonance of a broadcast signal received by wire or wirelessly. The broadcast signal includes any of audio, video, and additional information (for example, an electronic program guide (EPG)).

The tuner 140 may receive a broadcasting signal in a frequency band that corresponds to a channel number (for example, cable broadcasting 506) in accordance with a user input (for example, a control signal received from the controller 200, such as a channel number input, an up-down input, and a channel input on an EPG screen).

The tuner 140 of the image display apparatus 100b may include a single tuner, or may include more than one tuner. The tuner 140 may be implemented as an all-in-one apparatus with the image display apparatus 100b, or may be a separate apparatus having a tuner electrically connected to the image display apparatus 100b (for example, a set-top box (not shown) and a tuner connected to the input/output interface 170).

The communicator 150 may communicatively connect the image display apparatus 100b to an external device (for example, an audio device or the like) under the control of the controller 130. The controller 130 may transmit/receive content to/from the external device that is connected via the communicator 150, download an application from an external device, or browse the web. The communicator 150 may include any one of a wireless LAN module 151, a Bluetooth module 152, and a wired Ethernet module 153, according to the performance and structure of the display device 100. In one exemplary embodiment, the communicator 150 may include a combination of a wireless LAN module 151, a Bluetooth module 152, and a wired Ethernet module 153. The communicator 150 may receive a control signal of the control device 200 under the control of the controller 110. The control signal may be implemented as any of a Bluetooth type, a radio frequency (RF) signal type, or a wireless fidelity (Wi-Fi) type.

The communicator 150 may further include a near-field communication (for example, near-field communication (NFC), Bluetooth low energy, etc.) other than Bluetooth.

The sensor 160 may sense the user's voice, user's image, or user's interaction, and may include any of a microphone 161, a camera 162, and a light receiver 163.

The microphone 161 receives the uttered voice of the user. The microphone 161 converts the received voice into an electric signal and outputs the electric signal to the controller 130. The user's voice may include, for example, a voice that corresponds to the menu or function of the image display apparatus 100b. In one exemplary embodiment, a user input that corresponds to a command to search for the next object or a command to jump to the next object may be received via the microphone 161.

The camera 162 may receive an image (for example, a continuous frame) that corresponds to the motion of the user that includes the gesture in a camera recognition range. The controller 130 may select a menu displayed on the image display apparatus 100b or control in correspondence with the motion recognition result, by using the recognition result of the received motion. In one exemplary embodiment, a user gesture input that corresponds to a command to search for the next object or a command to jump to the next object may be received via the camera 162.

The light receiver 163 receives an optical signal (including a control signal) received from an external control device 30 through an optical window of a bezel of the display 110 or the like. The light receiver 163 may receive an optical signal that corresponds to a user input (for example, touch, pressed, touch gesture, voice, or motion) from the control device 30. A control signal may be extracted from the received optical signal under the control of the controller 130. In one exemplary embodiment, a user input that corresponds to a command to search for the next object or a command to jump to the next object may be received via the light receiver 163.

The input/output interface 170 receives video (for example, moving picture), audio (for example, audio, music, etc.) and additional information (for example, EPG, etc.) from the outside of the image display apparatus 100b under the control of the controller 130. The input/output interface 170 may include any one of a high-definition multimedia interface port 171, a component jack component jack 172, a personal computer (PC) port 173, and a universal serial bus (USB) port 174. The input/output interface 170 may include a combination of the HDMI port 171, the component jack 172, the PC port 173, and the USB port 174.

The controller 130 may control the overall operation of the image display apparatus 100b and the signal flow among internal components of the image display apparatus 100b and performs data processing functions. The controller 130 may execute an operation system (OS) and any of various applications stored in the storage 190, when the user has input or predefined conditions are satisfied.

The controller 130 may include a random access memory (RAM) that stores signals or data input from the outside of the image display apparatus 100b and that is used as a storage area corresponding to various tasks performed in the image display apparatus 100b, a read-only memory (ROM) that stores a control program for controlling the image display apparatus 100b, and a processor.

In one exemplary embodiment, by executing one or more instructions stored in the storage 190, the controller 130 may control the display 110 to display a main view that provides an image of an area that corresponds to a specified angle of view in the 360-degree image; detects one or more objects in other areas of the 360-degree image that are not displayed in the main view; and control the display 110 to display one or more sub-views that correspond to the detected objects.

In one exemplary embodiment, by executing one or more instructions stored in the storage 190, the controller 130 may determine an area that corresponds to an angle of view that includes each of the detected objects, and may determine a sub-view providing an image that corresponds to the determined area.

In one exemplary embodiment, by executing one or more instructions stored in the storage 190, the controller 130 may use at least one of a facial recognition operation and a motion detecting operation in order to detect an object.

In one exemplary embodiment, by executing one or more instructions stored in the storage 190, the controller 130 may receive information that relates an object to be detected via a user interface, and detect the object based on the received information about the object.

In one exemplary embodiment, by executing one or more instructions stored in the storage 190, the controller 130 obtains the information about the object to be detected from metadata that corresponds to the 360-degree image, and detects the object based on the obtained information about the object.

In one exemplary embodiment, by executing one or more instructions stored in the storage 190, the controller 130 may detect the object based on a user's request or in an automatic manner.

In one exemplary embodiment, by executing one or more instructions stored in the storage 190, the controller 130 may control the display to display an image of an area that corresponds to a specified angle of view in a 360-degree image, and in response to detecting an event that indicates a user input that has a direction and a predetermined pattern, detect at least one object that appears when the angle of view is shifted toward the direction, and jump to the area including the at least one object or increase a rotational speed until the area that includes the at least one object is reached, or move the at least one object detected in a sub-view to a main view to display the detected at least one object in the main view, and control the display to display an image that corresponds to the area that includes the detected at least one object.

In one exemplary embodiment, by executing one or more instructions stored in the storage 190, the controller 130 may stop the jumping or the increasing of the rotational speed in response to the cancellation of the event.

The processor may include a graphics processing unit for graphics processing corresponding to the video. The processor may be implemented as a system-on-chip (SoC) incorporating a core and a GPU. The processor may include any of a single core, a dual core, a triple core, a quad core, and multiples thereof.

The processor may also include a plurality of processors. In one exemplary embodiment, the processor may be implemented as a main processor and a sub processor operating in a sleep mode.

In one exemplary embodiment, the storage 190 may store various data, programs, or applications for driving and controlling the image display apparatus 100b under the control of the controller 130. The storage 190 may store input/output signals or data that corresponds to driving of the video processor 180, the display 110, the audio processor 115, the audio output interface 125, the power supply 120, the tuner 140, the communicator 150, the sensor 160, and the input/output interface 170. The storage 190 may store a control program for controlling the image display apparatus 100b and the controller 130, an application initially provided by a manufacturer or downloaded from the outside, a graphical user interface (GUI) associated with an application, an object (for example, image text, icons, buttons, etc.) for providing the GUI, user information, documents, databases, and/or related data.

In one exemplary embodiment, the storage 190 may include one or more applications including: one or more instructions for displaying a main view providing an image of an area that corresponds to a specified angle of view in the 360-degree image, one or more instructions for detecting one or more objects in other areas of the 360-degree image, the other areas in which the main view is not displayed, one or more instructions for displaying one or more sub-views that corresponds to the detected one or more objects, one or more instructions for detecting at least one object that appears when the angle of view is shifted toward a direction, in response to detecting an event that indicates a user input that has the direction and a predetermined pattern, and one or more instructions for: jumping to the area that includes the at least one object or increasing a rotational speed until the area that includes the at least one object is reached; or moving the at least one object detected in a sub-view to the main view to display the at least one object in the main view and displaying an image that corresponds to the area that includes the detected at least one object.

In one exemplary embodiment, the term "storage" includes the storage 190, a ROM of the controller 130, a RAM, and/or a memory card (for example, a micro SD card, a USB memory, not shown) mounted on the image display 100b. In one exemplary embodiment, the storage 190 may include any of a nonvolatile memory, a volatile memory, a hard disk drive (HDD), or a solid state drive (SSD).

The image display apparatus 100b that has the display 110 may be electrically connected to a separate external device (for example, a set-top box, not shown) having a tuner. In one exemplary embodiment, the image display apparatus 100b may be implemented as any of an analog TV, a digital TV, a 3D-TV, a smart TV, an LED TV, an OLED TV, a plasma TV, a monitor, or the like, but is not limited thereto, which would be apparent to one of ordinary skill in the art.

In this aspect, the block diagrams of the video display devices 100a and 100b shown in FIGS. 4 and 5 are block diagrams for one exemplary embodiment. Each component of the block diagrams may be integrated, added, or omitted according to the specifications of the image display apparatus 100 actually implemented. In particular, two or more components may be combined into one component as needed, or one component may be divided into two or more components. In one exemplary embodiment, the functions performed in each block are intended to illustrate exemplary embodiments, and the specific operations or apparatuses do not limit the scope of the present disclosure.

A method of displaying a sub-view on the basis of an object will be described with reference to FIGS. 6 to 18 according to exemplary embodiments.

FIG. 6 is a flowchart illustrating a process of displaying a sub-view based on an object in the image display apparatus, according to an exemplary embodiment.

Referring to FIG. 6, in operation S610, the image display apparatus may display a main view that provides an image of an area that corresponds to a specified angle of view in a 360-degree image.

In one exemplary embodiment, the image display apparatus may display only the main view on a display, or may display one or more sub-views together with the main view on the display.

In one exemplary embodiment, the image display apparatus may determine an area according to a specified angle of view. In one exemplary embodiment, the image display apparatus may determine an image of the front side of the 360-degree image, that is, an image that corresponds to the angle of view of zero (0) degrees. In one exemplary embodiment, the image display apparatus may receive a user input that relates to an angle of view to be displayed on the main view in the 360-degree image.

In operation S620, the image display apparatus may detect one or more objects in other areas, which are not displayed in the main view, in the 360-degree image. The other area that is not displayed in the main view in the 360-degree image may be any area of the 360-degree image that is not the area displayed in the main view, or a part of the other area.

In one exemplary embodiment, the graphic processor 181 of the image display apparatus 100b may convert a 360-degree image into a spherical image and detect one or more objects in the other area of the 360-degree image which is outside of the area displayed on the main view.

In one exemplary embodiment, whether to detect one or more objects in the other area not displayed in the main view in the image display apparatus 100 may be set in advance in the image display apparatus 100 based on the user's input before starting the reproduction of the 360-degree image.

In one exemplary embodiment, the detecting of one or more objects in the other area not displayed in the main view in the image display apparatus 100 may be performed according to a user's request during the reproduction of the 360-degree image. In one exemplary embodiment, when the image display apparatus 100 starts to reproduce a 360-degree image and then an icon is displayed on the display 110 and the image display apparatus 100 receives a user input that relates to selecting the icon, the image display apparatus 100 may detect one or more objects in the other area not displayed in the main view. In one exemplary embodiment, when the image display apparatus 100 starts to reproduce a 360-degree image and then senses the selection of a specific button which is defined to correspond to <sub-view display> via the control device 30, the image display apparatus 100 may detect one or more objects in the other area that is not displayed in the main view.

In one exemplary embodiment, the image display apparatus 100 may operate to display a sub-view based on an object, by default, without specific user input or settings.

FIG. 7 is a reference view for explaining an area of a 360-degree image on which object detection is performed.

Referring to 700a of FIG. 7, the graphic processor 181 of the image processing apparatus 100 performs object-sensing on the other area 705 of the 360-degree image 700 which is outside of an area 710 displayed in the main view.

Referring to 700b of FIG. 7, in one exemplary embodiment, the graphic processor 181 of the image processing apparatus 100b may divide the other area 705 of the 360-degree image 700 which is outside of the area 710 displayed in the main view into sub-areas 720, 730, 740, 750, 760, 770, 780, and 790, and perform an object detecting operation on at least one sub-area of the sub-areas 720, 730, 740, 750, 760, 770, 780, and 790.

In one exemplary embodiment, the image display apparatus 100 may have prior information or history information that relates to a 360-degree image to be reproduced. In one exemplary embodiment, the image display apparatus 100 may predict an area where an object is likely to appear in the 360-degree image 700 from the prior information or the history information. In one exemplary embodiment, the image display apparatus 100 may predict an area where an object may come out by reproducing a part of the file of the 360-degree image 700 in advance. Accordingly, without performing object-detecting on all the remaining areas of the 360-degree image which are outside of the area displayed in the main view, the image display apparatus 100 may perform object-detecting only on an area where an object is expected to appear, thereby saving resources of the graphic processor 181.

In one exemplary embodiment, the image display apparatus 100 may determine various objects. The object may be any type of object that may be detected in a 360-degree image by the graphic processor 181. An object may belong to a category including a person, an animal, a thing, a nature, or may be a face, in detail, a particular face, or a specific shape or motion of the particular face. The image display apparatus 100 may have information about an object to be internally detected, or the image display apparatus 100 may determine an object to be detected from a user input. The determination of an object will be described in detail below with reference to FIGS. 10 to 17.

In one exemplary embodiment, the image display apparatus 100 may use at least one of various techniques, such as, for example, an object-sensing technique or a face sensing technique.

In one exemplary embodiment, the user may adjust the angle of view of the image provided in the main view. Therefore, the area of the angle of view that corresponds to the main view may be continuously changed. In this case, in response to the continuous change in the area of the angle of view, the image display apparatus 100 may continuously change the outer area of the area displayed in the main view based on the change in the area that corresponds to the angle of view in the main view, and detect an object in the changed area.

Referring again to FIG. 6, in operation S630, the image display apparatus 100 may display one or more sub-views that correspond to the detected one or more objects.

When the image display apparatus 100 detects a plurality of objects in the other area of the 360-degree image which is outside of the area displayed in the main view, the image display apparatus 100 may display a plurality of sub-views that respectively correspond to the plurality of objects.

Thus, according to the operation of the image display apparatus 100 shown in FIG. 6, it is possible to provide a sub-view in accordance with a direction in which a motion is captured or a direction in which a predetermined object is detected by analyzing characteristics of a 360-degree image. In addition, the image display apparatus 100 may automatically adjust the number of sub-views based on the number of objects detected at each reproducing point-in-time. In one exemplary embodiment, at a certain time point, three objects are detected and thus three sub-views are displayed. However, at the following time point, only two objects may be detected and thus the number of the sub-views may be reduced to two, and, at the next time point, four objects are detected and thus the number of the sub-views may be increased to four.

Figure 8:
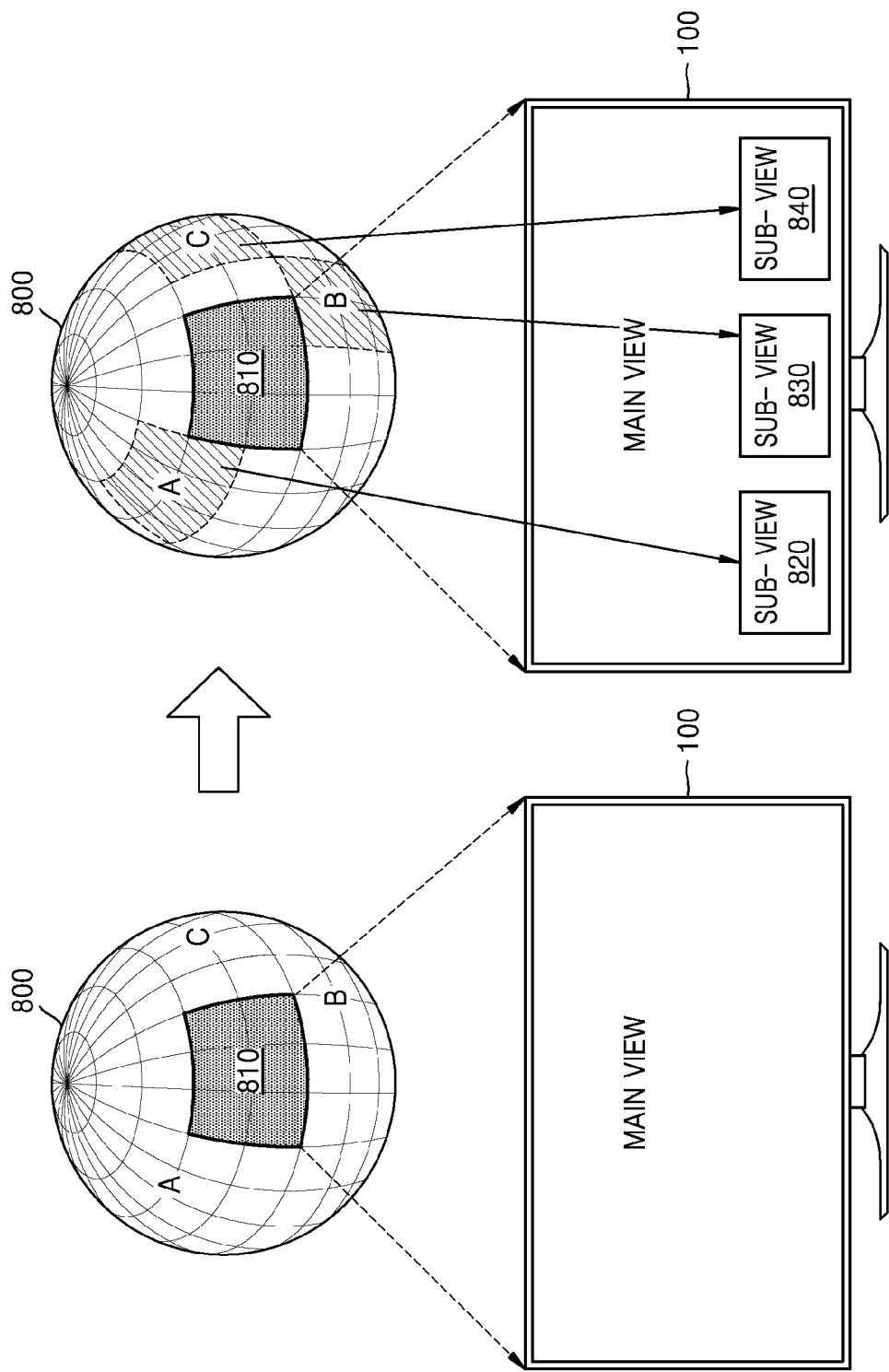
FIG. 8 is a reference view for explaining an image display apparatus for further displaying a sub-view in addition to a main view based on the object detection operation, according to an exemplary embodiment.

FIG. 8 is a reference view for explaining an image display apparatus for further displaying a sub-view in addition to a main view based on an object detecting operation, according to an exemplary embodiment.

Referring to FIG. 8, at a certain point in time, the image display apparatus displays a main view that corresponds to an area 810 of a 360-degree image 800 on a display. The image display apparatus 100 may detect objects A, B, and C in an area other than the area 810 that corresponds to the main view in the 360-degree image 800.

Once the objects A, B, and C are detected, the image display apparatus 100 may display a sub-view 820 that corresponds to an area that includes the detected object A, a sub-view 830 that corresponds to an area that includes the detected object B, and a sub-view 840 that corresponds to an area that includes the detected object C, together with the main view.

Figure 9:
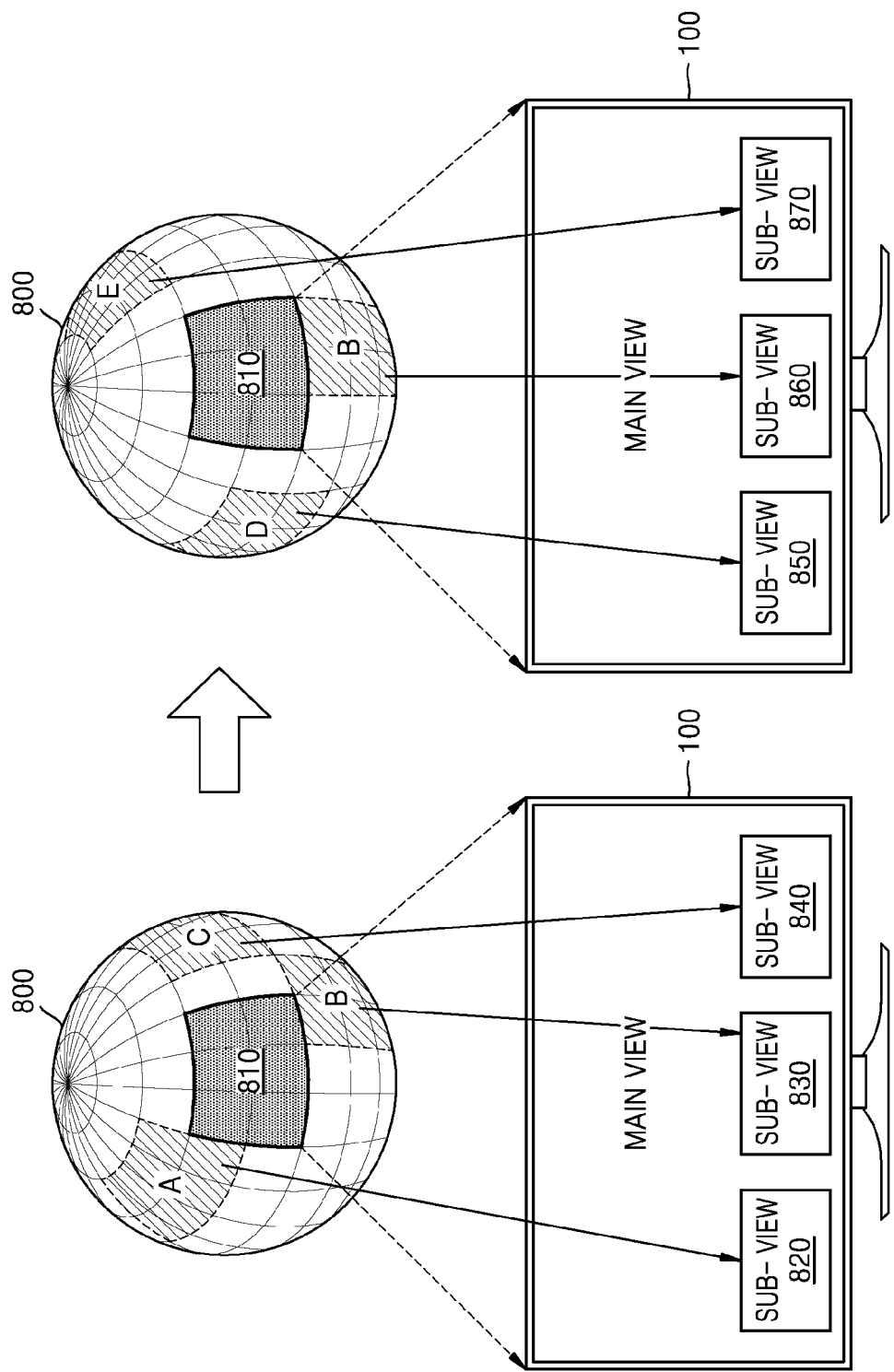
FIG. 9 is a reference view for explaining an image display apparatus for changing an area displayed in a sub-view based on a movement of an area in which an object is detected, according to an exemplary embodiment.

FIG. 9 is a reference view for explaining an image display apparatus for changing an area displayed in a sub-view based on a movement of an area in which an object is detected, according to an exemplary embodiment.

Referring to FIG. 9, the image display apparatus 100 displays, together with the main view, the sub-view 820 that corresponds to the area that includes the object A, the sub-view 830 that corresponds to the area that includes the object B, and the sub-view 840 that corresponds to the area that includes the object C. When the image display apparatus 100 newly detects objects D and E in the area other than the area 810 that corresponds to the main view at a certain point of time and the position of the object B is changed, the image display apparatus 100 may display a sub-view 850 that corresponds to an area that includes the object D, a sub-view 860 that corresponds to an area that includes the object B detected at the changed position, and a sub-view 870 that corresponds to an area that includes the object E, together with the main view.

A 360-degree image file of a 360-degree image may include meta information that contains information that relates to the 360-degree image separately from the 360-degree image file or inside the 360-degree image file.

Figure 10:
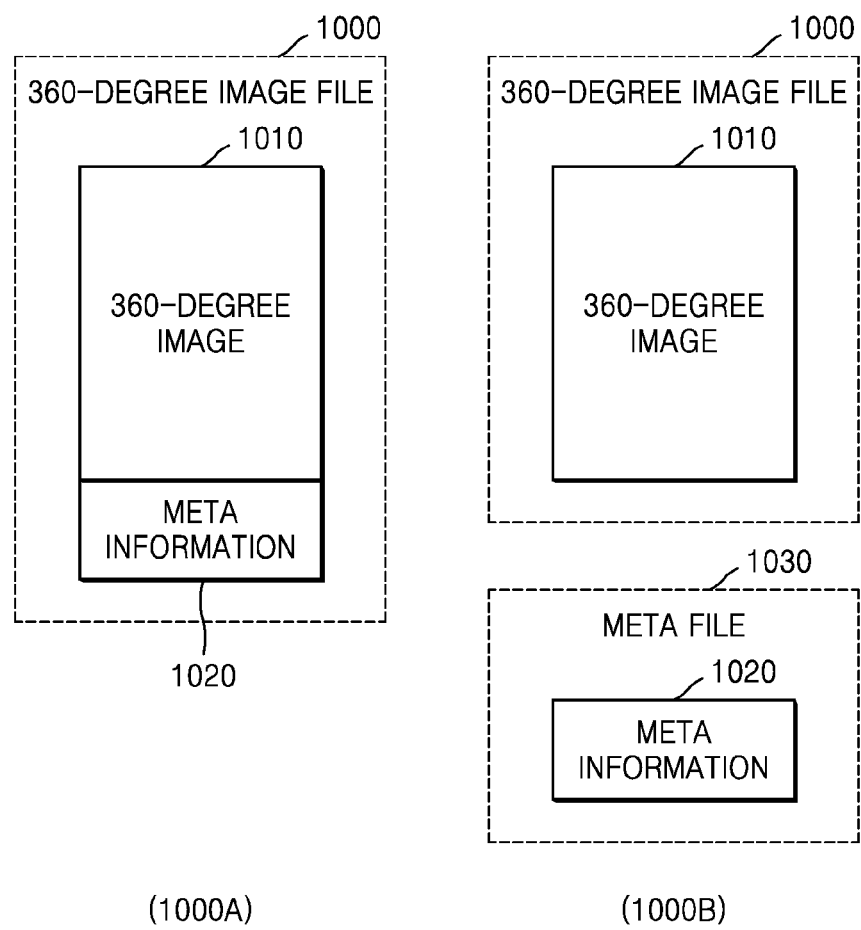
FIG. 10 is a reference view for explaining meta information about a 360-degree image, according to exemplary embodiments.

FIG. 10 is a reference view for explaining meta information that relates to a 360-degree image, according to exemplary embodiments.

Referring to 1000A of FIG. 10, a 360-degree image file 1000 may include the 360-degree image 1010 and the meta information 1020 which includes information that relates to the 360-degree image 1010.

Referring to 1000B of FIG. 10, the 360-degree image file 1000 includes the 360-degree image 1010 and a separate metafile 1030 that includes the meta information 1020 which includes information that relates to the 360-degree image 1010.

Figure 11:
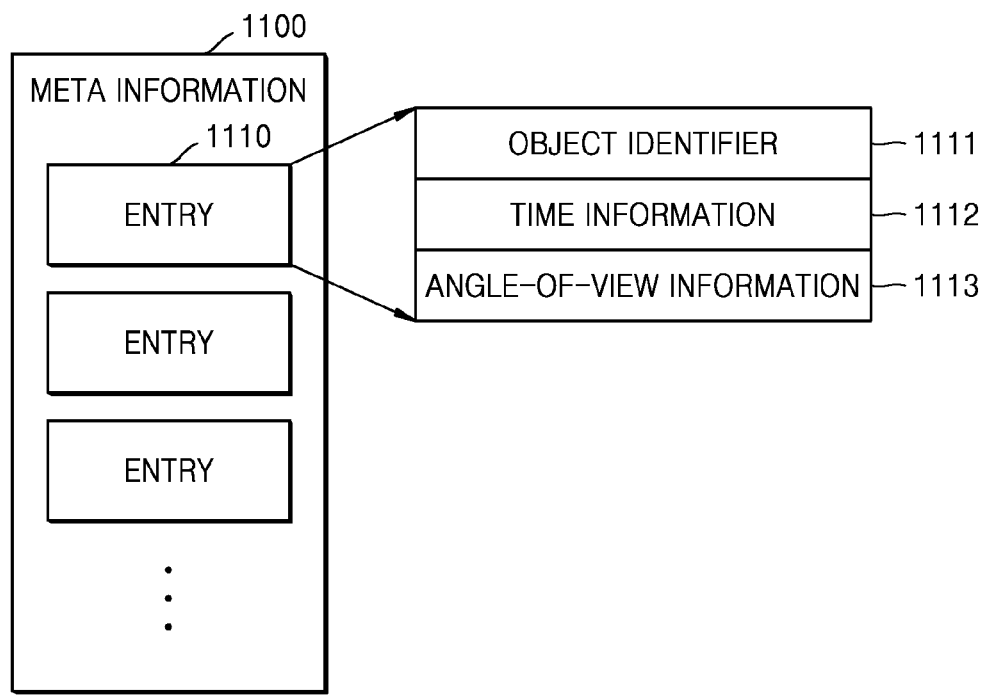
FIG. 11 illustrates an example of content to be included in meta information, according to an exemplary embodiment.

FIG. 11 illustrates an example of content to be included in meta information, according to an exemplary embodiment.

Referring to FIG. 11, the meta information 1100 may include a plurality of entries 1110. Each of the entries 1110 may include an object identifier 1111, time information 1112, and angle-of-view information 1113.

The object identifier 1111 is information for identifying an object.

Time information 1112 represents information that relates to one or more time points or one or more frames during which an object appears in a 360-degree image.

The angle-of-view information 1113 indicates position information, that is, an angle of view, when the object appears in the 360-degree image at each time or each frame of the time information 1112.

As shown in FIG. 11, by storing information about the time and angle of view of the object in the meta information about the 360-degree image, the image display apparatus 100 may provide a sub-view that corresponds to an area in which an object appears, without detecting the object in the 360-degree image through a face-detecting operation or an object-detecting operation.

Figure 12:
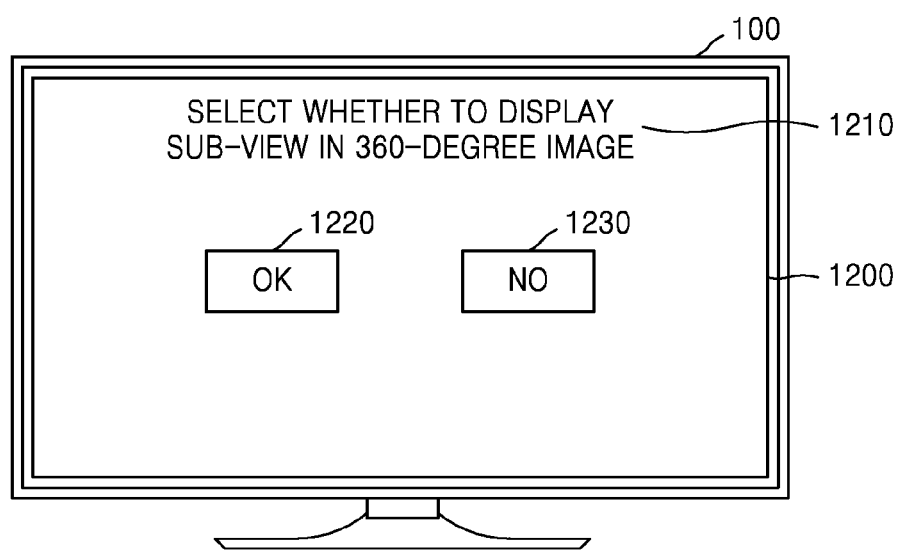
FIG. 12 illustrates an example of a user interface that enables a user to determine whether to display a sub-view in a 360-degree image in an image display apparatus, according to an exemplary embodiment.

FIG. 12 illustrates an example of a user interface that enables a user to determine whether to display a sub-view in a 360-degree image in the image display apparatus 100, according to an exemplary embodiment.

Referring to FIG. 12, the image display apparatus 100 may display, on a display, a user interface 1200 that includes a message 1210 inquiring whether to display a sub-view in a 360-degree image. When the user selects an <OK> item 1220, the image display apparatus 100 may provide one or more sub-views based on an object-detecting operation, and when the user selects a <NO> item 1230, the image display apparatus 100 may not provide a sub-view.

Figure 13:
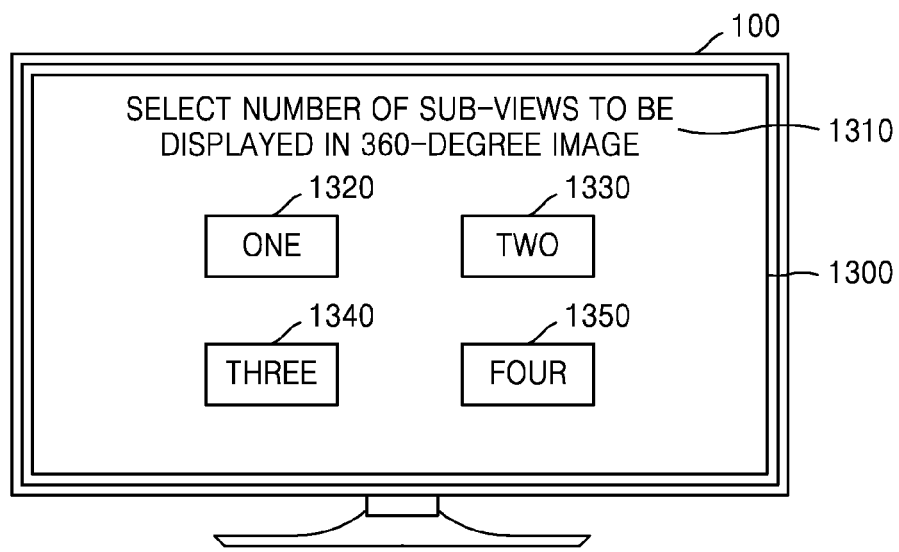
FIG. 13 illustrates an example of a user interface that enables a user to determine the number of sub-views to be displayed in a 360-degree image in an image display apparatus, according to an exemplary embodiment.

FIG. 13 illustrates an example of a user interface that enables a user to determine the number of sub-views to be displayed in a 360-degree image in an image display apparatus, according to an exemplary embodiment.

Referring to FIG. 13, the image display apparatus 100 may display, on a display, a user interface 1300 that includes a message 1310 requesting to select the number of sub-views to be displayed in a 360-degree image. The user may select one of, for example, a 1-item 1320, a 2-item 1330, a 3-item 1340, and a 4-item 1350. The image display apparatus 100 may display one or more objects detected in a 360-degree image based the number of sub-views selected by the user. If a 0-item button is provided on the user interface 1300, and if the user selects the 0-item button, it is determined that the image display apparatus 100 is being guided not to display a sub-view, and the image display apparatus 100 may not display the sub-view.

Figure 14A:
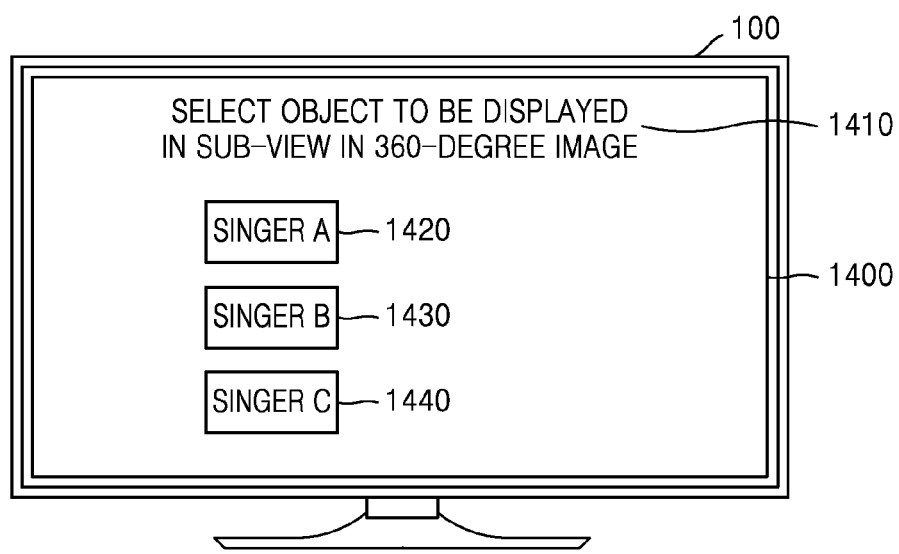
FIG. 14A illustrates an example of a user interface that enables a user to select an object to be displayed in a sub-view in a 360-degree image, according to an exemplary embodiment.

FIG. 14A illustrates an example of a user interface that enables a user to select an object to be displayed in a sub-view in a 360-degree image, according to an exemplary embodiment.

Figure 14B:
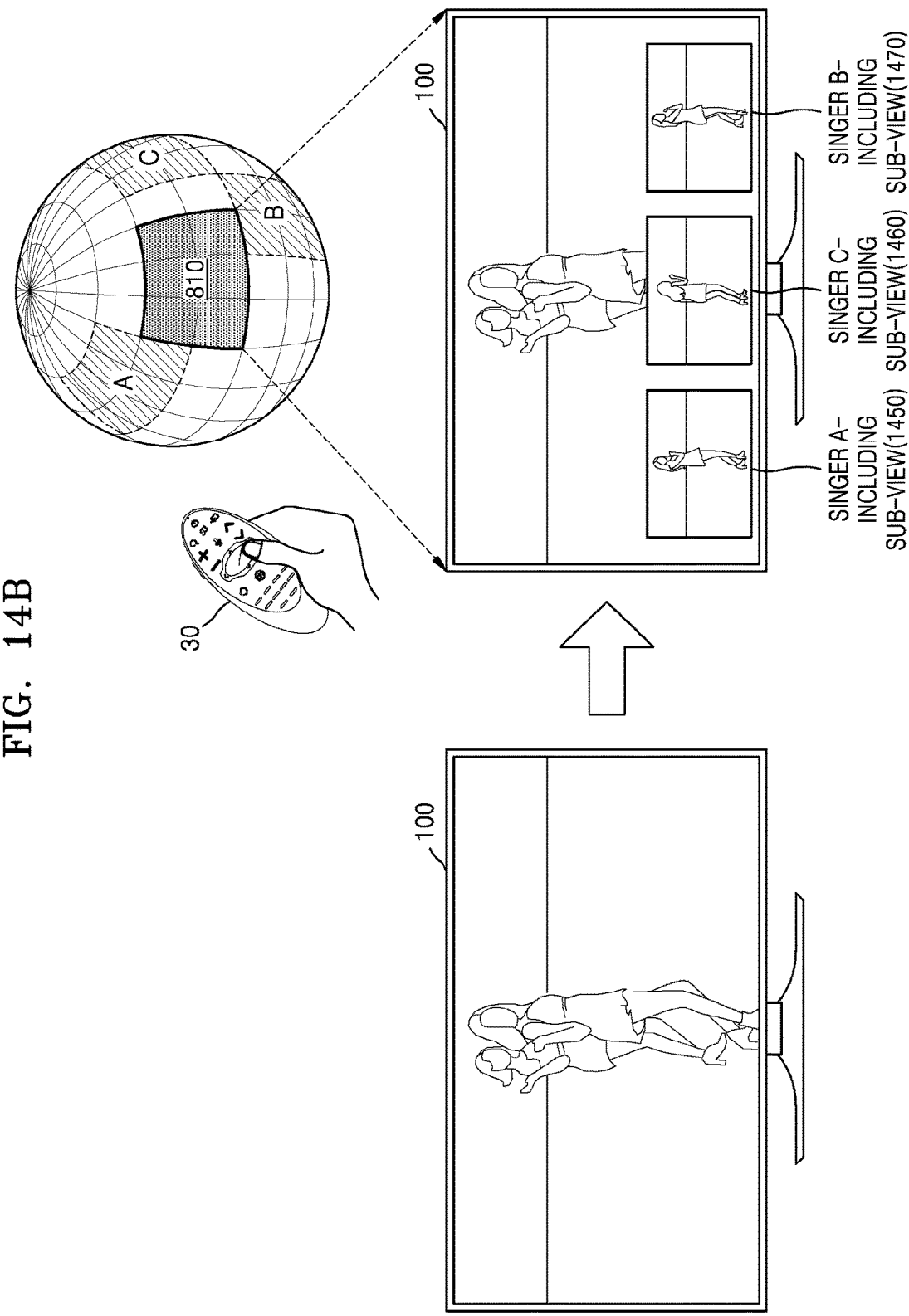
FIG. 14B is a reference view for explaining an operation of an image display apparatus in response to the selection in the user interface shown in FIG. 14A.

FIG. 14B is a reference view for explaining the operation of an image display apparatus in response to the selection in the user interface shown in FIG. 14A.

Referring to FIG. 14A, the image display apparatus 100 may display, on a display, the user interface 1400 which includes a message 1410 requesting to select an object to be displayed in a sub-view in a 360-degree image. In one exemplary embodiment, if the 360-degree image is a 360-degree music video of a group of singers, the user interface 1400 may provide the user with an option to select, as an object, a singer A item 1420, a singer B item 1430, and a singer C item 1440. In one exemplary embodiment, FIG.

14B illustrates an operation of the image display apparatus 100 in which the user selects all of the singer number A item 1420, the singer number B item 1430, and the singer number C item 1440 as an object in the user interface 1400.

Referring to FIG. 14B, while the image display apparatus 100 displays an image of an area 810 that corresponds to a certain angle of view as a main view, when at least one of singer A, singer B, and singer C selected by the user appears, a singer A including sub-view 1450, a singer B including sub-view 1470, and a singer C including sub-view 1460 are displayed, together with the main view. Embodiments are not limited to the present exemplary embodiment described in connection with FIG. 14B in which the image display apparatus 100 simultaneously displays the singer A-including sub-view 1450, the singer B-including sub-view 1470, and the singer C-including sub-view 1460, together with the main view. In one exemplary embodiment, if only the singer A is detected in an object-detecting operation at any time point, the image display apparatus 100 may display only the singer A-including sub-view 1450 together with the main view.

Figure 15A:
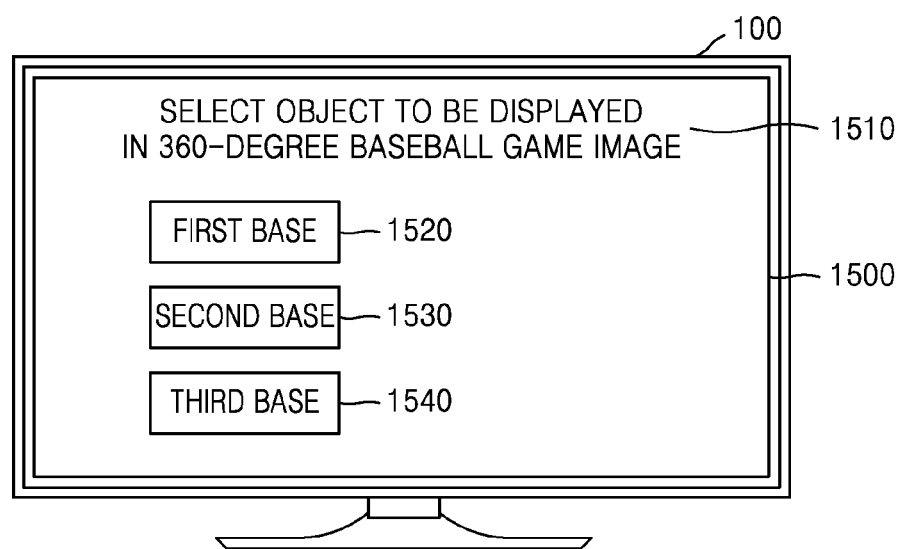
FIG. 15A shows an example of a user interface that enables a user to select an object to be displayed in a sub-view in a 360-degree image, according to an exemplary embodiment.

FIG. 15A shows another example of a user interface that enables a user to select an object to be displayed in a sub-view in a 360-degree image, according to an exemplary embodiment.

Figure 15B:
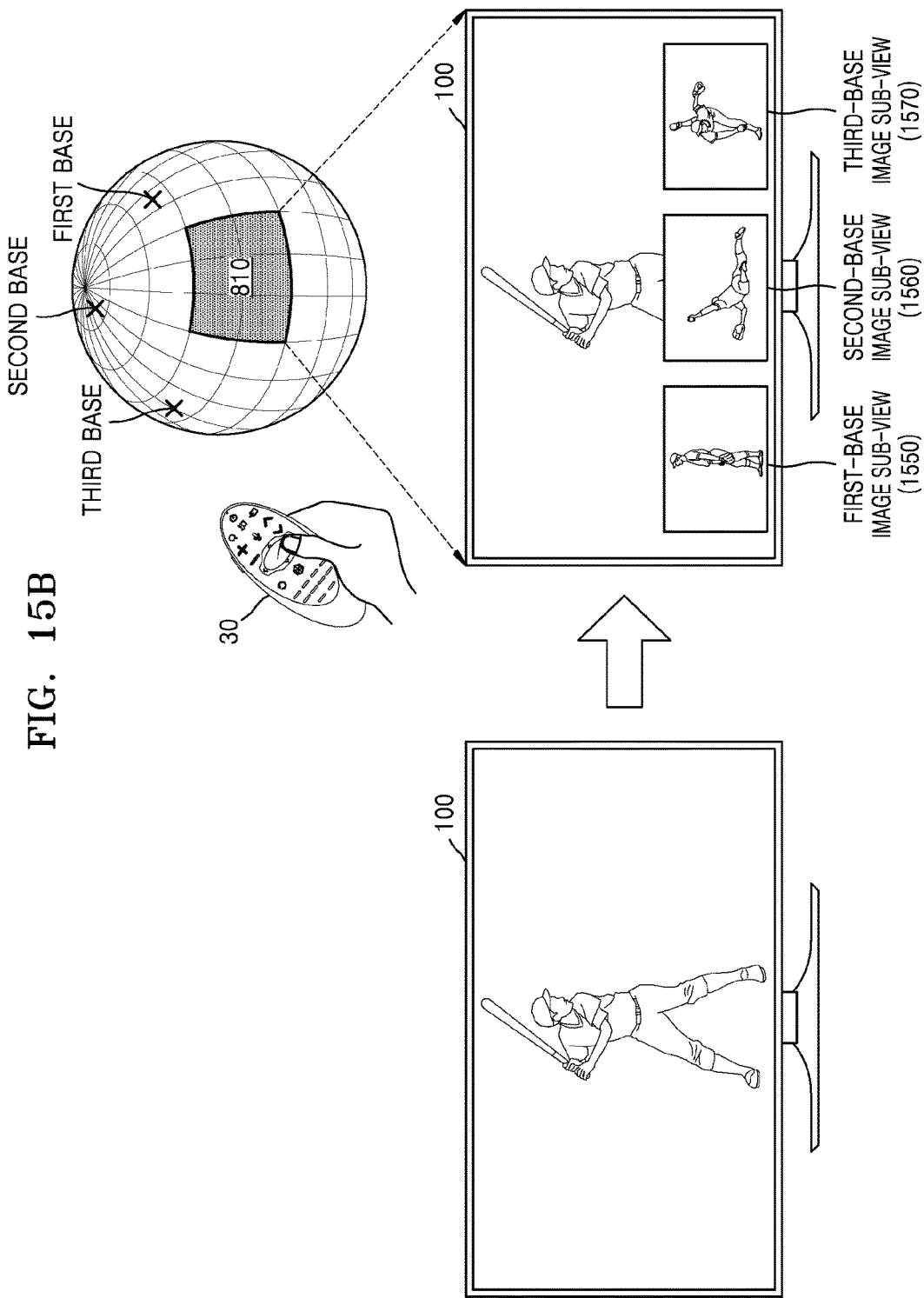
FIG. 15B is a reference view for explaining an operation of an image display apparatus in response to the selection in the user interface shown in FIG. 15A.

FIG. 15B is a reference view for explaining the operation of an image display apparatus in response to the selection in the user interface shown in FIG. 15A.

Referring to FIG. 15A, the image display apparatus 100 may display, on a display, the user interface 1500 that includes a message 1510 requesting to select an object to be displayed on a sub-view in a 360-degree image of a baseball game. In one exemplary embodiment, when a 360-degree image is of a baseball game from among sports images, the user interface 1500 may provide, as an object to be selected, a first-base item 1520, a second-base item 1530, and a third-base item 1540. In one exemplary embodiment, the operation of the image display apparatus 100 in which the user selects all of the first-base item 1520, second-base item 1530, and third-base item 1540 in the user interface 1500 is shown in FIG. 15B.

Referring to FIG. 15B, while the image display apparatus 100 displays the area 810 that corresponds to a predetermined angle of view as a main view, when an object appears in at least one of the first, second, and third bases selected by the user, a first-base image sub-view 1550, a second-base image sub-view 1560, and a third-base image sub-view 1570 may be displayed together with the main view.

Figure 16:
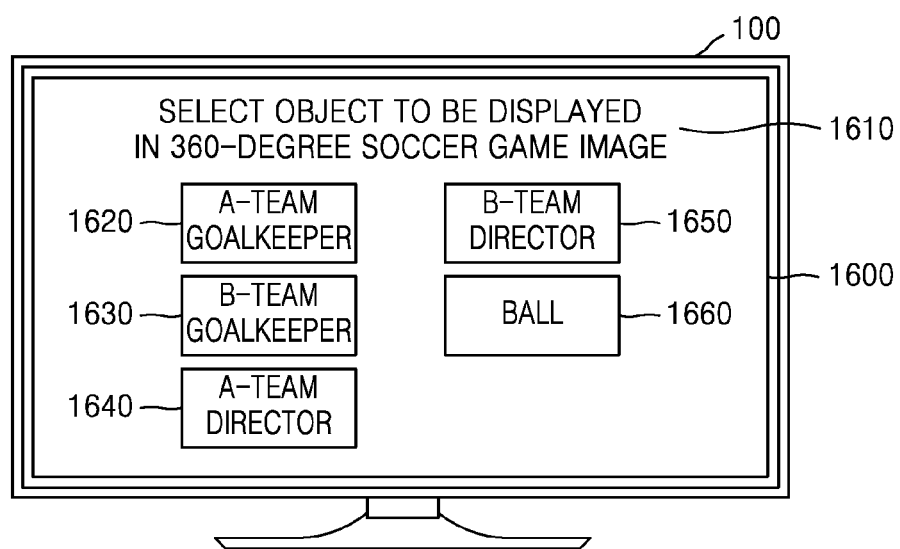
FIG. 16 shows an example of a user interface that enables a user to select an object to be displayed in a sub-view in a 360-degree image, according to an exemplary embodiment.

FIG. 16 shows another example of a user interface that enables a user to select an object to be displayed in a sub-view in a 360-degree image, according to an exemplary embodiment.

Referring to FIG. 16, the image display apparatus 100 may display, on a display, the user interface 1600 that includes a message 1610 requesting to select an object to be displayed on a sub-view in a 360-degree image of a soccer game. In one exemplary embodiment, if the 360-degree image is of a soccer game, the user interface 1600 may provide, as an object to be selected, an A-team goalkeeper item 1620, a B-team goalkeeper item 1630, a A-team director item 1640, a B-team director item 1650, and a ball item 1660.

The user interfaces for selecting an object to be displayed in a sub-view illustrated in FIGS. 14A, 15A, and 16 are an example only to explain exemplary embodiments, and various items may be displayed as an object to be selected. As an item, for example, any of a face, nature, animal, etc. may be displayed.

In one exemplary embodiment, the image display apparatus 100 may determine the number of sub-views or an area to be displayed in the sub-views based on characteristics of various sports images. In particular, as described above, the image display apparatus 100 may predict that the user's interest object varies based on characteristics of a sports game such as a soccer game and a baseball game. Thus, according to a sport game, the number of sub-views and an area to be displayed may vary.

In one or more exemplary embodiments, an object may be directly selected by the user by using the name of the object, or the user may be prompted to select an area to be selected as an object in a 360-degree image or a pause screen of the 360-degree image.

Figure 17:
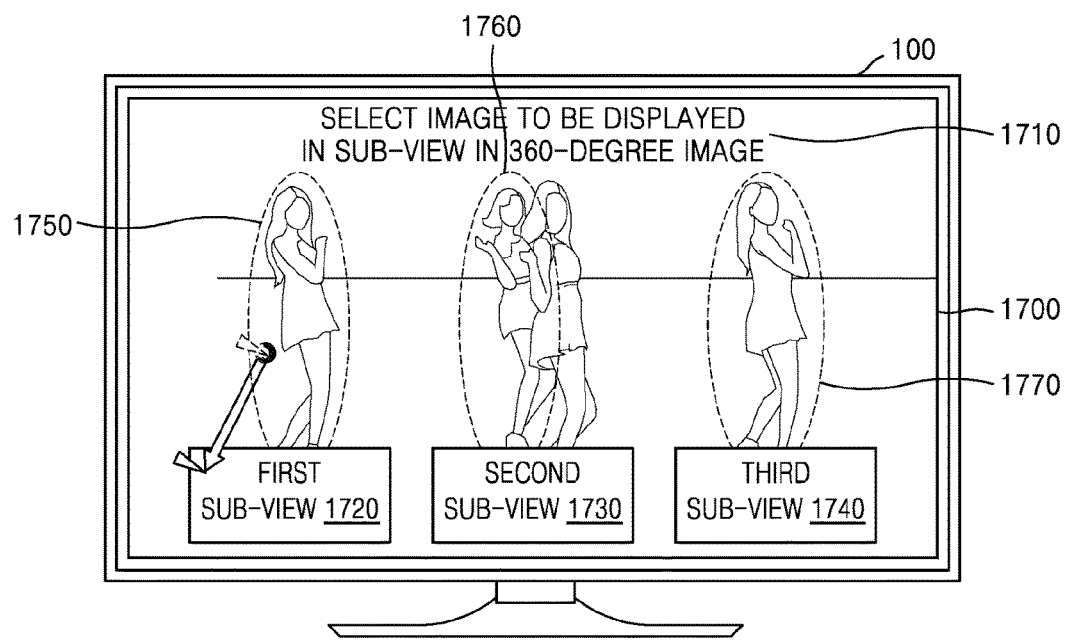
FIG. 17 shows an example of a user interface that enables a user to select an object to be displayed in a sub-view in a 360-degree image, according to an exemplary embodiment.

FIG. 17 shows another example of a user interface that enables a user to select an object to be displayed in a sub-view in a 360-degree image, according to an exemplary embodiment.

Referring to FIG. 17, the image display apparatus 100 may display, on a display, a 360-degree image and the user interface 1700 that includes a message 1710 requesting to select an object to be displayed on a sub-view. The user interface 1700 further displays a first sub-view area 1720, a second sub-view area 1730, and a third sub-view area 1740. In one exemplary embodiment, as shown in FIG. 17, four singers are displayed in the displayed 360-degree image, the user selects one or more of the displayed singers by using the control device 30 or the user's hand, and the selected singer object is dragged to and then released from one of the first sub-view area 1720, the second sub-view area 1730, and the third sub-view area 1740, for example, the first sub-view area 1720, thereby being displayed on first sub-view area 1720. If there is a singer object in another area of the 360-degree image that is not displayed in the user interface 1700 in the 360-degree image, the user may move the angle of view by using the control device 30 to display the singer object on the image display apparatus 110, and then, the displayed singer object is selected.

Figure 18:
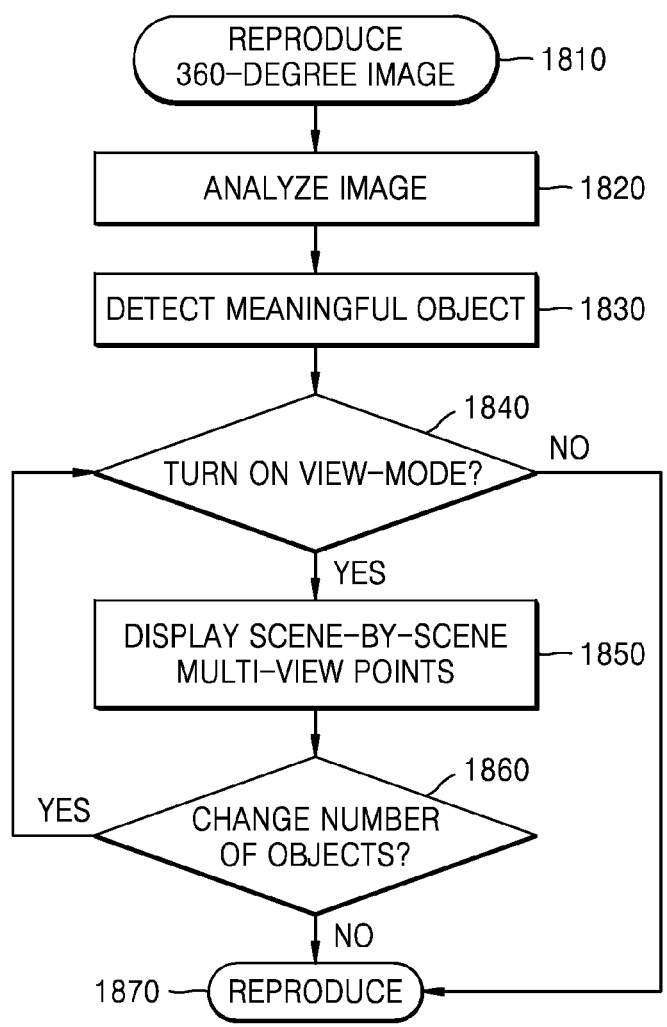
FIG. 18 is a flowchart of an example of the operation of an image display apparatus, according to an exemplary embodiment.

FIG. 18 is a flowchart of an example of the operation of an image display apparatus, according to an exemplary embodiment.

Referring to FIG. 18, in operation 1810, the image display apparatus 100 may reproduce a 360-degree image.

In operation 1820, the image display apparatus 100 may analyze the 360-degree image together with the reproducing of the 360-degree image.

In operation 1830, the image display apparatus 100 may detect a meaningful object by analyzing the 360-degree image. The meaningful object may include an object determined to be detected by the image display apparatus 100 or an object selected based on a user input, among various objects included in the 360-degree image.

In operation 1840, the image display apparatus 100 determines whether a view mode is on, and if the view mode is not on, the 360-degree image may be reproduced in operation 1870 without any other operation. The view mode may indicate a mode in which the image display apparatus 100 displays one or more sub-views in addition to the main view on a display. The view mode may be turned on according to the default value set in the image display apparatus 100, or may be turned on as the image display apparatus 100 receives a user input to turn on the view mode via the user interface.

In operation 1850, when the view mode is turned on, the image display apparatus 100 may display scene-by-scene multi-view points. The image display apparatus 100 may display an area that includes each of one or more objects sensed in operation 1830 by using a plurality of views. The image display apparatus 100 may display an area that includes each of one or more objects detected in operation 1830 by using a plurality of views.

In operation 1860, if there is a change in the number of objects detected through image analysis, the image display apparatus 100 adjusts the number of sub-views, and proceeds to operation 1840. If there is no change in the number of detected objects, reproducing operation 1870 may be performed.

Figure 19:
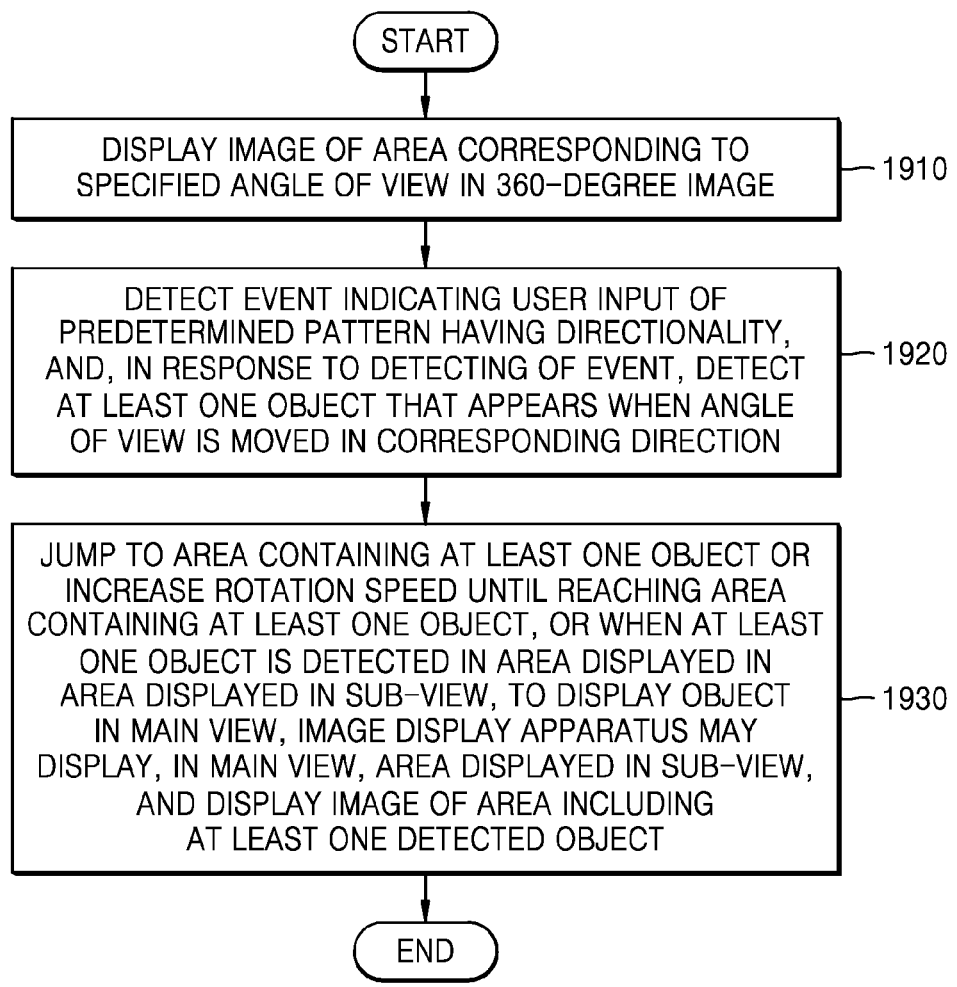
FIG. 19 is a flowchart illustrating a process of detecting or displaying an object based on a user input of a specific pattern in an image display apparatus, according to an exemplary embodiment.

FIG. 19 is a flowchart illustrating a process of detecting or displaying an object based on a user input of a specific pattern in an image display apparatus, according to an exemplary embodiment.

Referring to FIG. 19, in operation 1910, the image display apparatus 100 may display an image of an area that corresponds to a specified angle of view in a 360-degree image.

In operation 1920, the image display apparatus 100 detects an event that indicates a user input of a predetermined pattern having directionality, and detects at least one object that appears when the angle of view is moved in the corresponding direction in response to the detecting of the event. In one exemplary embodiment, when a user input event of long pressing the right-direction key among the four-direction keys of the control device 30 is detected, the image display apparatus 100 may detect an object in an area that corresponds to an angle of view is shifted rightward with respect to the area of the 360-degree image.

In operation 1930, when at least one object is detected, the image display apparatus 100 may jump to an area that contains the at least one object, or increase the rotation speed until reaching the area that contains at least one object, or when the at least one object is detected in an area displayed in a sub-view, to display the object in a main view, the image display apparatus 100 may display, in a main view, the area displayed in the sub-view, and display an image of an area that includes the at least one detected object.

Figure 20:
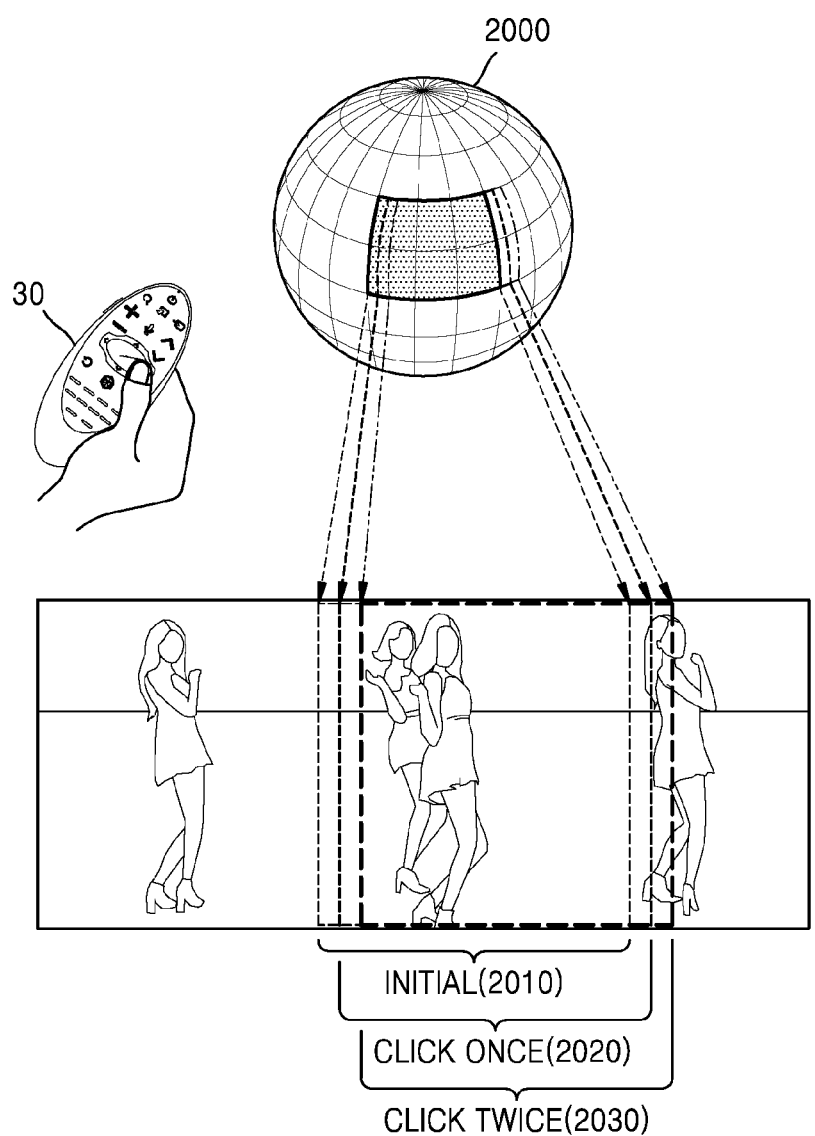
FIG. 20 is a view for explaining an operation of an image display apparatus displaying a 360-degree image when a user input that corresponds to pressing of a right-direction key of a control device is received, according to an exemplary embodiment.

FIG. 20 is a view for explaining an operation of an image display apparatus that displays a 360-degree image when a user input that corresponds to pressing of a right-direction key of a control device is received, according to an exemplary embodiment.

Referring to FIG. 20, a right-direction key input of the control device 30 may be sensed while the image display apparatus 100 displays an area 2010, which is initially shown, in the 360-degree image 2000. When the right-direction key input is sensed, the image display apparatus 100 may display an area 2020 that corresponds to an angle of view shifted rightward by a predetermined angle with respect to the angle of view that corresponds to the area 2010. When the right-direction key input is sensed again, the image display apparatus 100 may display an area 2030 that corresponds to an angle of view shifted rightward by a predetermined angle with respect to the angle of view that corresponds to the area 2020. As described above, the image display apparatus 100 may display an image that corresponds to an angle of view that is increased rightward by a certain angle by the input of the right-direction key of the control device 30.

Figure 21:
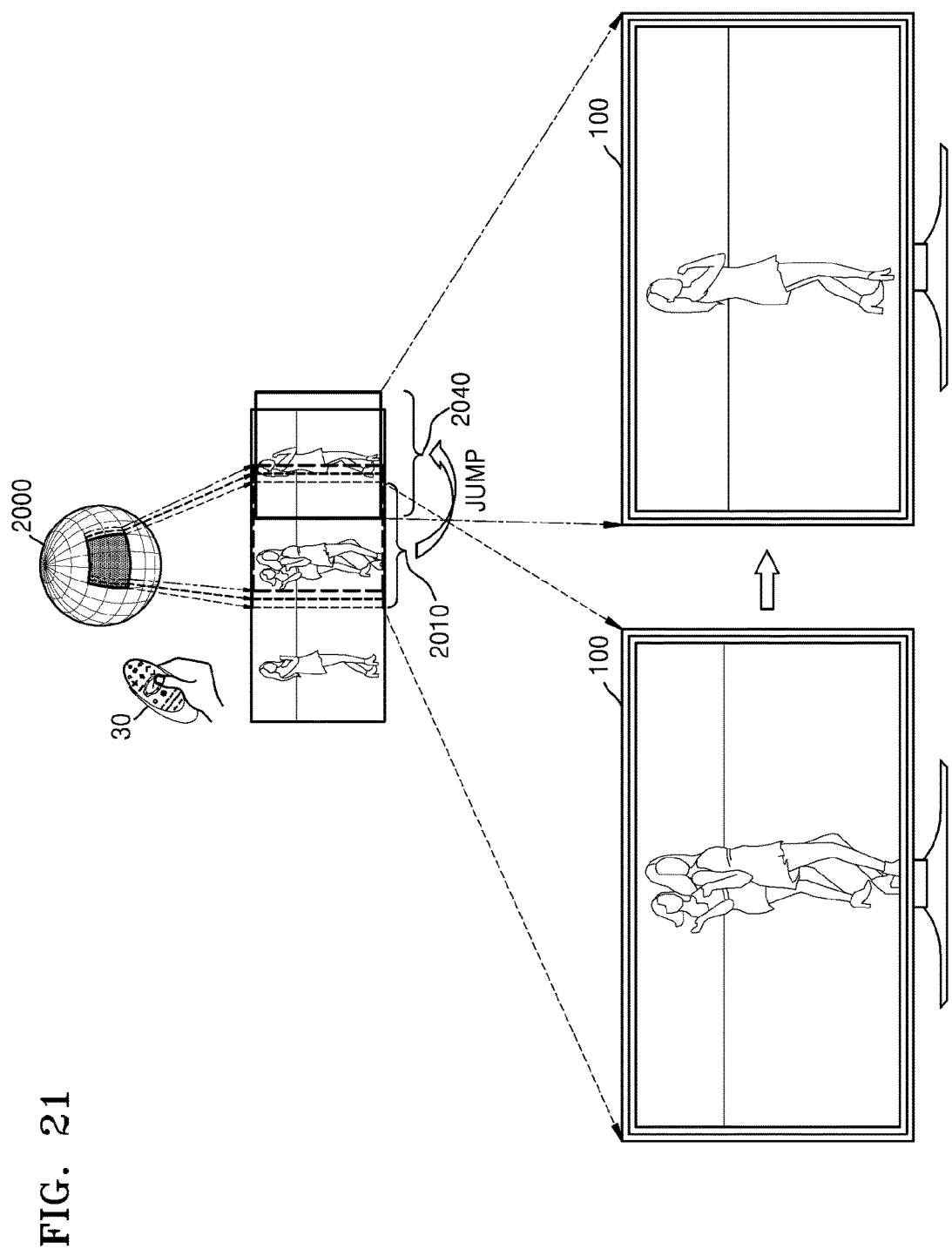
FIG. 21 is a reference view for explaining an operation of an image display apparatus according to an exemplary embodiment, in which, upon sensing a user input of a specific pattern, the image display apparatus moves between images by jumping.

FIG. 21 is a reference view for explaining an operation of an image display apparatus according to an exemplary embodiment, in which, upon sensing a user input of a specific pattern, the image display apparatus moves between images by jumping.

Referring to FIG. 21, the image display apparatus 100 may sense a user input of a specific pattern having directionality, for example, an input for long pressing a right-direction key of the four-direction key of the control device 30 while displaying an image that corresponds to the area 2010. In response to the user input of this specific pattern, the image display apparatus 100 may detect an object included in a right-side area, which is an area in the right side of the area 2010. When an object is detected in the right-side area, the image display apparatus 100 may skip displaying of an image of an area between the currently displayed area and the right-side area that includes the object, and jump immediately to an image that corresponds to the area 2040 and display the corresponding image.

By using the user input of a predefined specific pattern, the image display apparatus 100 may quickly detect and display the next object that appears in a specific direction.

Figure 22:
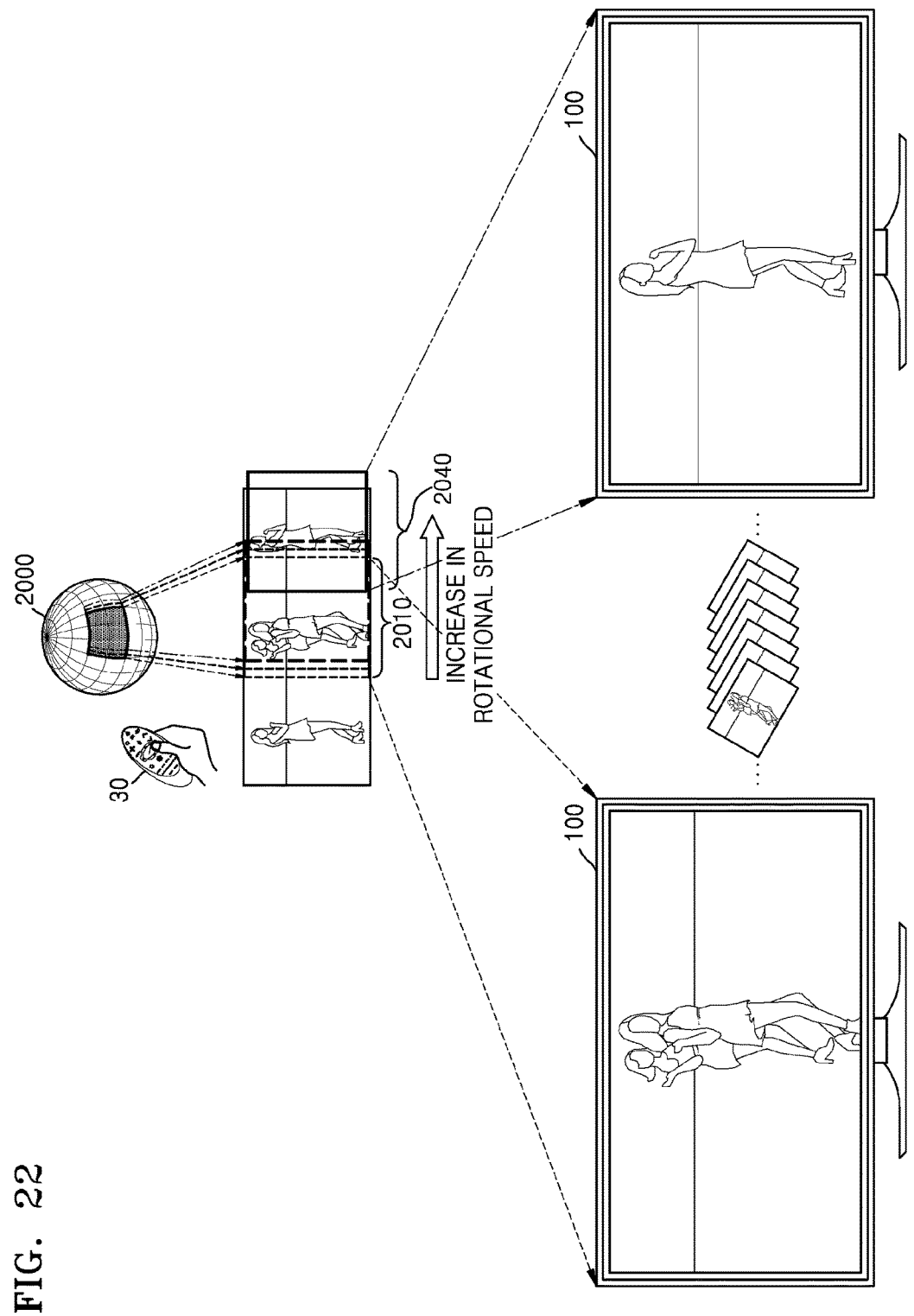
FIG. 22 is a reference view for explaining an operation of an image display apparatus according to an exemplary embodiment, in which, upon sensing a user input of a specific pattern, the image display apparatus moves between images by high-speed rotation.

FIG. 22 is a reference view for explaining an operation of an image display apparatus according to an exemplary embodiment, in which, upon sensing a user input of a specific pattern, the image display apparatus moves between images by high-speed rotation.

Referring to FIG. 22, the image display apparatus 100 may sense a user input of a specific pattern having directionality, for example, an input for long pressing a right-direction key of the four-direction key of the control device 30 while displaying an image that corresponds to the area 2010. In response to the user input of this specific pattern, the image display apparatus 100 may detect an object included in a right-side area, which is an area in the right side of the area 2010. When an object is detected in the right-side area, the image display apparatus 100 may display a plurality of images that respectively correspond to areas between the currently displayed area and the right-side area that includes the object at a high rotational speed, and may display an image that corresponds to the right-side image, that is, an image that corresponds to the area 2040.

Figure 23:
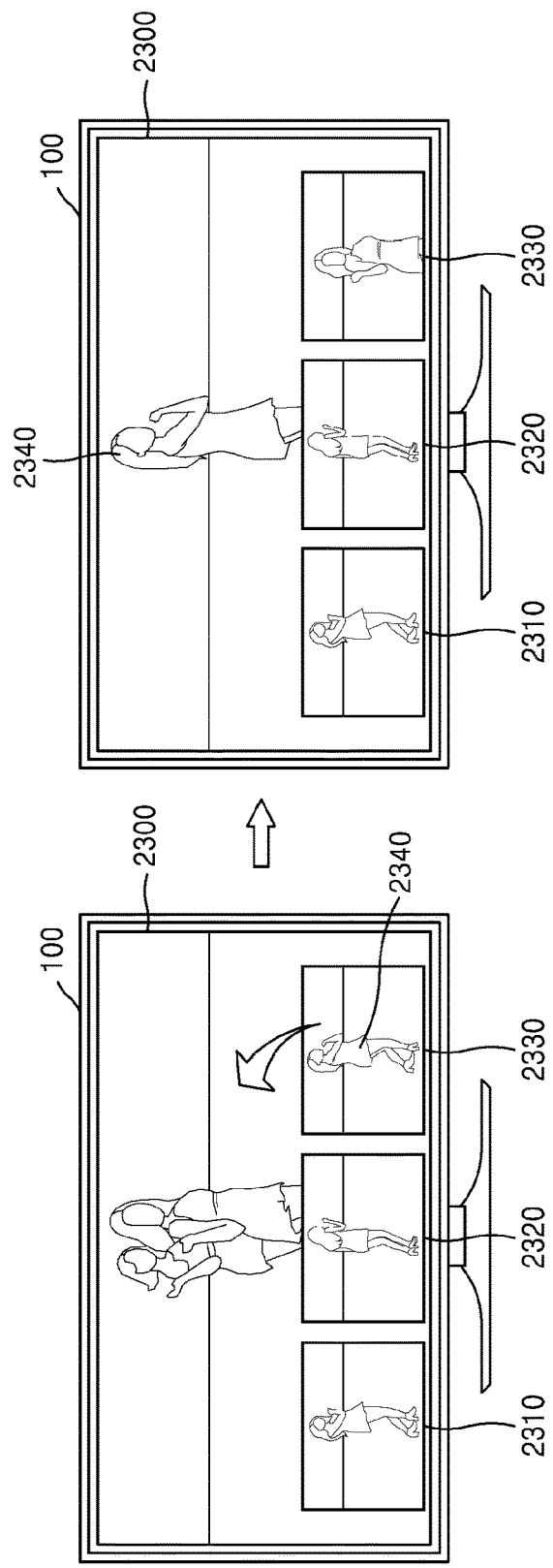
FIG. 23 is a reference view for explaining an operation of the image display apparatus according to an exemplary embodiment, in which, upon sensing a user input of a specific pattern, the image display apparatus moves an image, which has been displayed in a sub-view, into a main view, thereby displaying the image in the main view.

FIG. 23 is a reference view for explaining an operation of the image display apparatus 100 according to an exemplary embodiment, in which, upon sensing a user input of a specific pattern, the image display apparatus 100 moves an image, which has been displayed in a sub-view, into a main view 2300, thereby displaying the image in the main view 2300.

Referring to FIG. 23, while displaying the main view 2300 and sub-views 2310, 2320 and 2330 together, the image display apparatus 100 may sense a user input of a specific pattern having directionality, for example, long pressing a right-direction key among four-direction key of the control device 30. In response to the user input of this specific pattern, the image display apparatus 100 may detect an object included in a right-side area, that is, an area in the right side of the area 2010. When the object included in the right-side area is, for example, an object 2340 included in the sub-view 2330, the image display apparatus 100 may move the image that includes the object 2340 that has been displayed in the sub-view 2330, to the main view 2300, thereby displaying the image that includes the object 2340 in the main view 2300.

Figure 24:
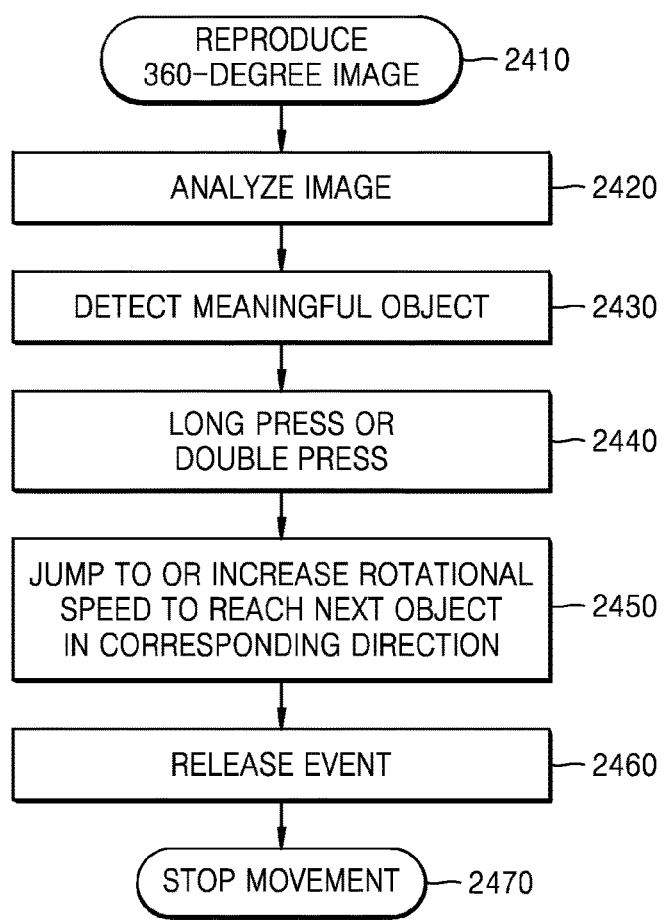
FIG. 24 is a flowchart of an example of the operation of an image display apparatus, according to an exemplary embodiment.

FIG. 24 is a flowchart of an example of the operation of an image display apparatus, according to an exemplary embodiment.

Referring to FIG. 24, in operation 2410, the image display apparatus 100 may reproduce a 360-degree image.

In operation 2420, the image display apparatus 100 may analyze the 360-degree image together with the reproducing of the 360-degree image.

In operation 2430, the image display apparatus 100 may detect a meaningful object by analyzing the image 360-degree. The meaningful object may include an object determined to be detected by the image display apparatus 100 or an object selected based on a user input, from among various objects included in the 360-degree image.

In operation 2440, the image display apparatus 100 may sense a user input of a specific pattern, such as a long press or a double press of a direction key.

In operation 2450, the image display apparatus 100 may jump to the next object in the direction of the direction key based on the user input in order to increase the rotation speed until the image is displayed or the next object is displayed in response to the sensing of user input of a specific pattern. In particular, as a result of the operation of detecting a meaningful object in operation 2430, the image display apparatus 100 may determine the next object in an area in a direction that corresponds to a direction key based on the user input with respect to the 360-degree area. To display the next object determined as described above on a display in a short period of time, the image display apparatus 100 jumps directly to an area that includes the next object and displays an image that corresponds to the area that contains the next object, or may display images that respectively correspond to areas before reaching the area that include the next object at a high speed.

On detecting that the event that corresponds to the user input is cancelled in operation 2460, the image display apparatus 100 may stop the movement in the direction that corresponds to the direction key that corresponds to the user input in operation 2470.

When an image display apparatus provides a main view and one or more sub-views by using a 360-degree image according to exemplary embodiments, an image provided to one or more sub-views is not an image that corresponds to a fixed angle of view, but instead is an image based on an object. By doing so, a meaningless image may not be provided to a user.

Further, according to exemplary embodiments, one or more objects included in a 360-degree image can be effectively searched for or reproduced by using a user input of a specific pattern.

A method of operating the image display apparatus according to an exemplary embodiment may be implemented in the form of a program command that is executed by using various computer means and recorded in a computer-readable recording medium. The computer-readable recording medium may include any of a program command, a data file, and/or a data structure solely or in combination. Program commands recorded in the computer-readable recording medium may be specifically designed and configured for implementing one or more exemplary embodiments, or may be well known to and usable by one of ordinary skill in the art of computer software. Examples of the computer-readable recording medium include magnetic media (e.g., hard disks, floppy disks, and magnetic tapes), optical media (e.g., compact disk-read-only memories (CD-ROMs) and digital versatile disks (DVDs)), magneto-optical media (e.g., floptical disks), and hardware devices specifically configured to store and execute program commands (e.g., read-only memories (ROMs), random access memories (RAMs), and flash memories). Examples of program commands include not only machine language codes prepared by a compiler, but also high-level language codes which are executable by a computer by using an interpreter. Examples of program commands include not only machine language codes prepared by a compiler, but also high-level language codes which are executable by a computer by using an interpreter.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by persons having ordinary skill in the art that various changes in form and details may be made therein without departing from the spirit and scope as defined by the following claims.

What is claimed is:

1. An image display apparatus comprising:
    a display;
    a memory configured to store instructions; and
    a processor configured to execute the instructions to:
    control the display to display, as a main view, a first image of a first area of a 360-degree image content that corresponds to an angle of view,
    obtain meta information corresponding to the 360-degree image content, the meta information comprising information on one or more objects included in the 360-degree image content, the information on each object comprising an object identifier for identifying the object, time information indicating one or more time points or one or more frames during which the object appears in the 360-degree image content, and angle of view information indicating an angle of view in which the object appears in the 360-degree image content,
    based on the time information of the meta information representing when an object appears in a second area of the 360-degree image content other than the first area, display, as a sub-view, a second image corresponding to the second area of the 360-degree image content while displaying the first image.

2. The image display apparatus of claim 1, wherein the processor is further configured to execute the instructions to:
    receive the information on the one or more objects via a user interface, and
    obtain the meta information corresponding to the received information on the one or more objects.

3. The image display apparatus of claim 2, wherein the processor is further configured to execute the instructions to:
    detect the one or more objects from the 360-degree image content based on the time information, and the angle of view information in the obtained information.

4. The image display apparatus of claim 1, wherein the processor is further configured to execute the instructions to:
    in response to detecting an event that indicates a user input that has a direction and a predetermined pattern, detect at least one object that appears when the angle of view is shifted toward the direction; and
    control the display to jump to a third area that includes the at least one object or to increase a rotational speed until the third area that includes the at least one object is reached, or to move the at least one object detected in a sub-view to the main view in order to display the at least one object in the main view, and to display an image that corresponds to the third area that includes the detected at least one object.

5. The image display apparatus of claim 4, wherein the processor is further configured to execute the instructions to control the display to stop the jumping or the increasing of the rotational speed in response to detecting a cancellation of the event.

6. The image display apparatus of claim 4, wherein the user input comprises at least one from among a long press and a double press of a direction key.

7. A method of operating an image display device, the method comprising:
  processing an image to obtain a 360-degree image content,
    displaying, as a main view, a first image of a first area of the 360-degree image content that corresponds to an angle of view,
    obtaining meta information corresponding to the 360-degree image content, the meta information comprising information on one or more objects included in the 360-degree image content, the information on each object comprising an object identifier for identifying the object, time information indicating one or more time points or one or more frames during which the object appears in the 360-degree image content, and angle of view information indicating an angle of view in which the object appears in the 360-degree image content,
  based on the time information of the meta information representing when an object appears in a second area of the 360-degree image content other than the first area, displaying, as a sub-view, a second image corresponding to the second area of the 360-degree image content while displaying the first image.

8. The method of claim 7, further comprising:
  receiving, via a user interface, the information on the one or more objects, and
  obtaining the meta information corresponding to the received information on the one or more objects.

9. The method of claim 8, further comprising:
  detecting the one object one or more objects from the 360-degree image content based on the time information, and the angle of view information in the obtained information.

10. The method of claim 7, further comprising:
  in response to detecting an event that indicates a user input that has a direction and a predetermined pattern, detecting at least one object that appears when the angle of view is shifted toward the direction, and
  jumping to an area that includes the at least one object or increasing a rotational speed until the area that includes the at least one object is reached, or moving the at least one object detected in a sub-view to the main view in order to display the at least one object in the main view, and displaying a third image that corresponds to a third area that includes the at least one detected object.

11. The method of claim 10, further comprising stopping the jumping or the increasing of the rotational speed in response to detecting a cancellation of the event.

12. The method of claim 10, wherein the user input comprises at least one from among a long press and a double press of a direction key.

13. A non-transitory computer-readable recording medium having recorded thereon a program for executing, on a computer, the method according to claim 7.

* * * * *